United States Patent [19]
Shiojima et al.

[11] Patent Number: 5,477,127
[45] Date of Patent: Dec. 19, 1995

[54] SECONDARY BATTERY CHARGING CIRCUIT

[75] Inventors: Nobuo Shiojima; Sadakazu Enomoto, both of Tokyo, Japan

[73] Assignee: Toshiba Battery Co., Ltd., Tokyo, Japan

[21] Appl. No.: 287,309

[22] Filed: Aug. 8, 1994

Related U.S. Application Data

[62] Division of Ser. No. 775,755, Oct. 15, 1991, Pat. No. 5,391,974.

[51] Int. Cl.[6] ........................................... H02J 7/00
[52] U.S. Cl. ................................. 320/35; 320/27
[58] Field of Search ..................... 320/35, 21, 22, 320/23, 24

[56] References Cited

U.S. PATENT DOCUMENTS

| | | | |
|---|---|---|---|
| 3,599,071 | 8/1971 | Enghien et al. | 320/35 |
| 4,065,712 | 12/1977 | Godard et al. | 320/39 |
| 4,125,802 | 11/1978 | Godard | 320/35 |
| 4,209,736 | 6/1980 | Reidenbach | 320/22 |
| 4,237,411 | 12/1980 | Köthe et al. | 320/21 |
| 4,308,493 | 12/1981 | Köthe et al. | 320/35 |
| 4,888,544 | 12/1989 | Terry et al. | 320/37 |
| 5,329,219 | 7/1994 | Garrett | 320/22 |
| 5,339,018 | 8/1994 | Brokaw | 320/35 |
| 5,362,942 | 11/1994 | Vanderslice, Jr. et al. | 219/209 |
| 5,391,974 | 2/1995 | Shiojima et al. | 320/35 |

Primary Examiner—Steven L. Stephan
Assistant Examiner—Nicholas Ponomarenko
Attorney, Agent, or Firm—Oblon, Spivak, McClelland, Maier, & Neustadt

[57] ABSTRACT

A secondary battery charging circuit of this invention includes a charging source for supplying a charging current to a secondary battery, a temperature detection unit for generating an output which changes almost linearly with respect to a change in temperature of the secondary battery during a charging operation, a differential unit for obtaining a differential value of an output from the temperature detection unit, a comparator unit for comparing the differential value during the charging operation with a setting value, and for, when the relationship between the two values is reversed, generating an inverted output, a timer circuit unit, started simultaneously with start of the charging operation of the secondary battery, for generating a timer output after an elapse of a predetermined period of time, and a charge control unit for controlling the charging operation of the secondary battery in response to one, generated earlier, of the inverted output from the comparator unit, and the timer output from the timer circuit unit.

4 Claims, 24 Drawing Sheets

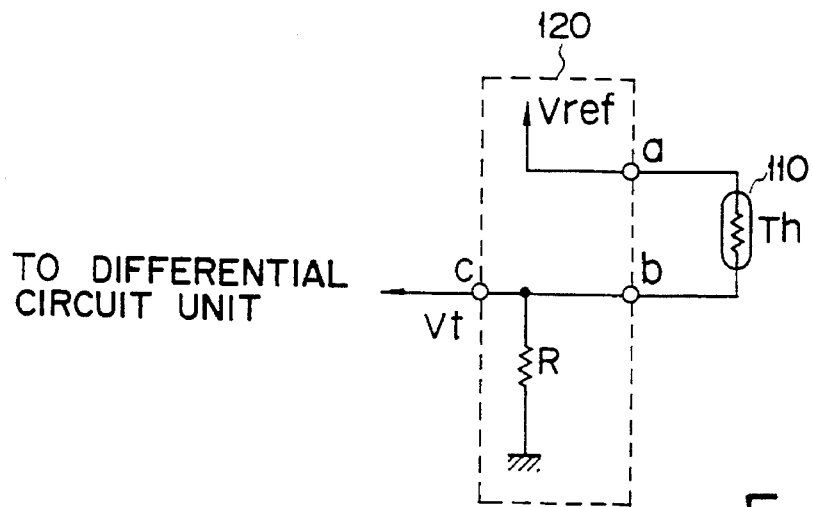
F I G. 2
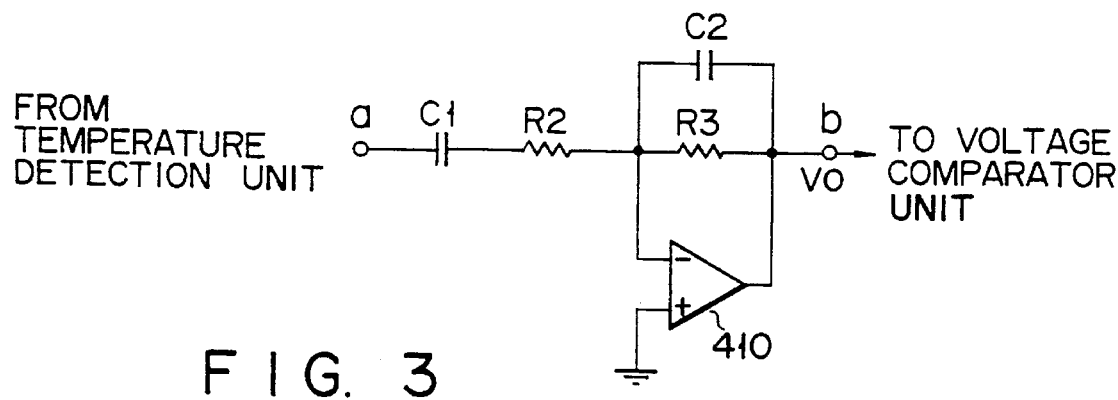
F I G. 3
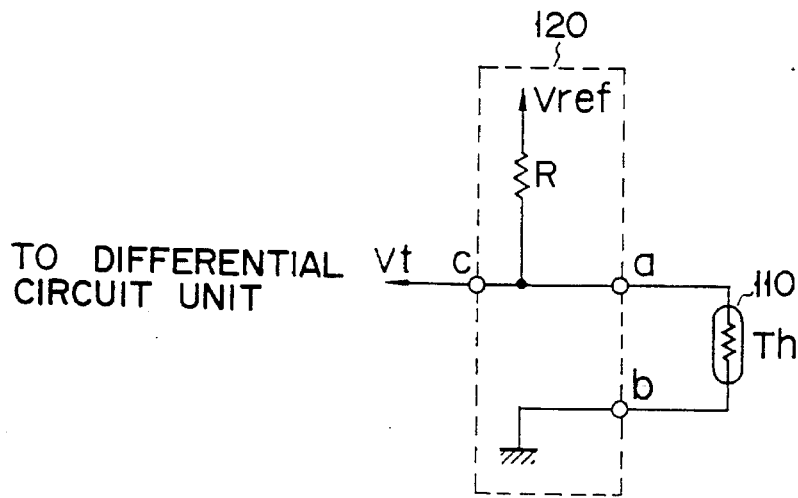
F I G. 4

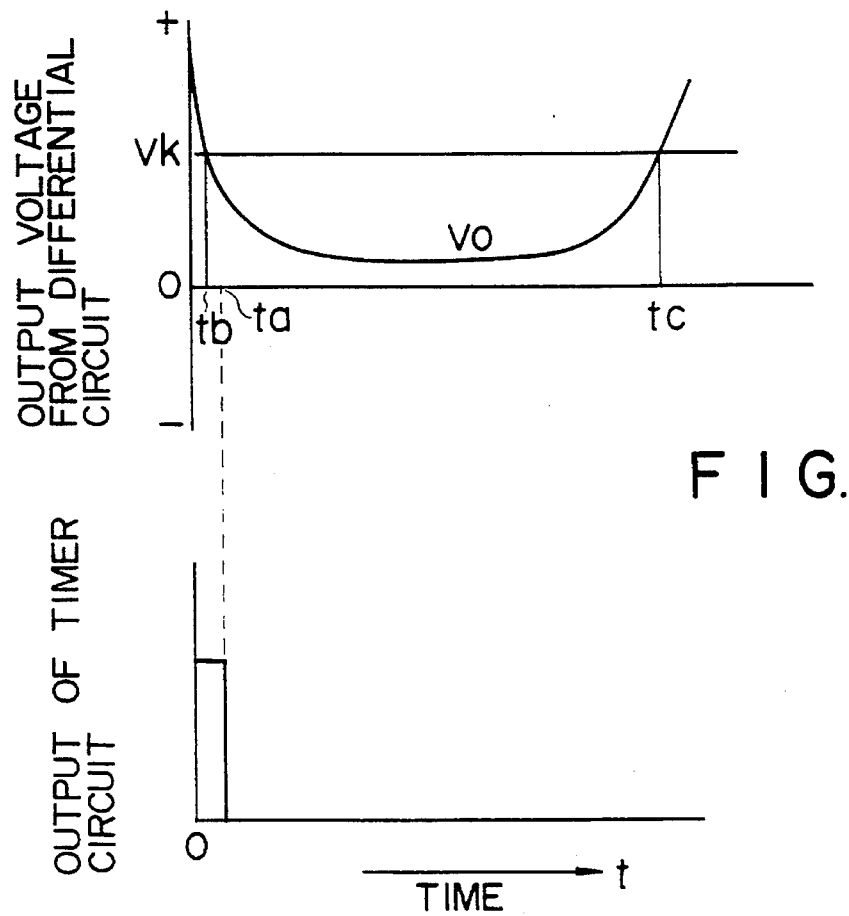
F I G. 7A
F I G. 7B
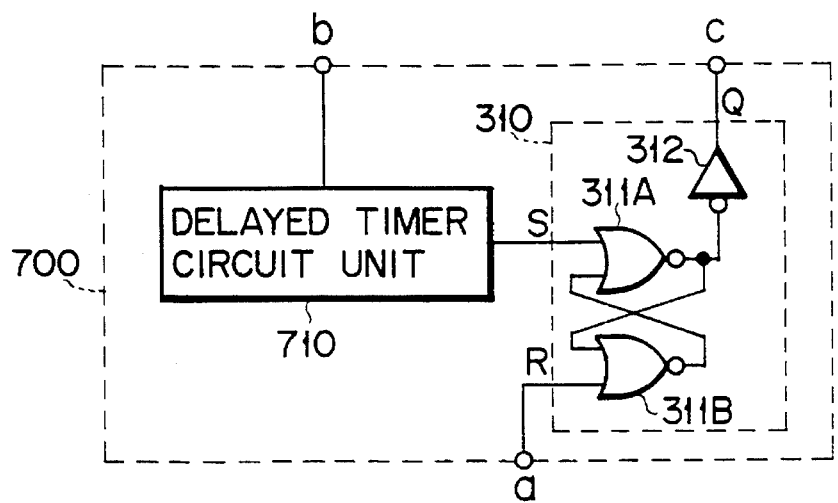
F I G. 8

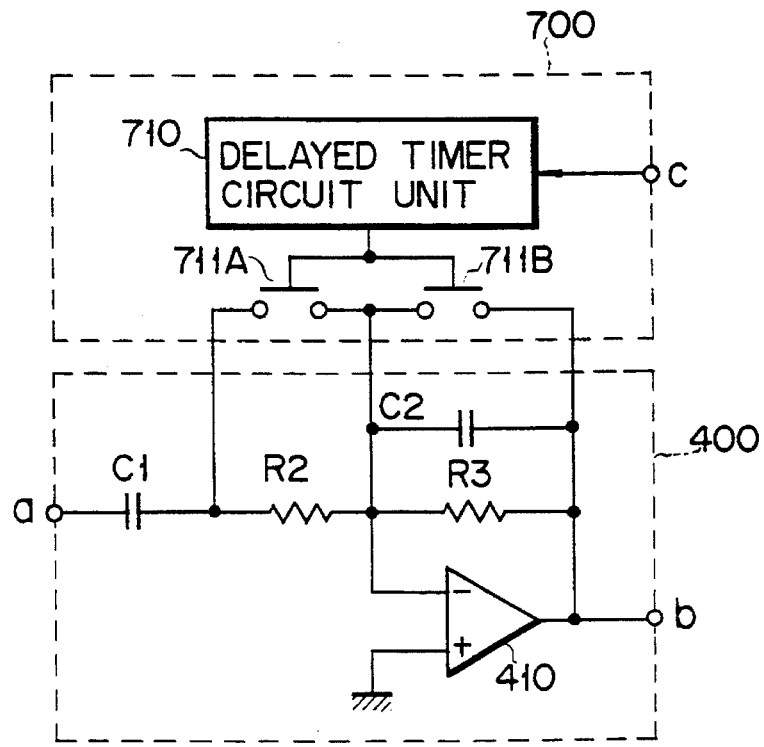
F I G. 9
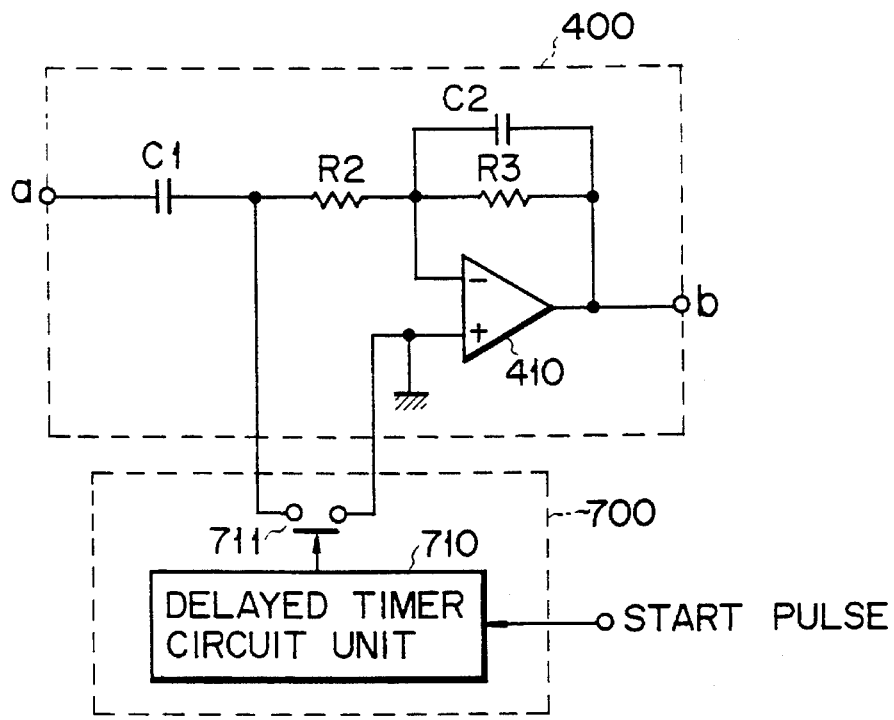
F I G. 10

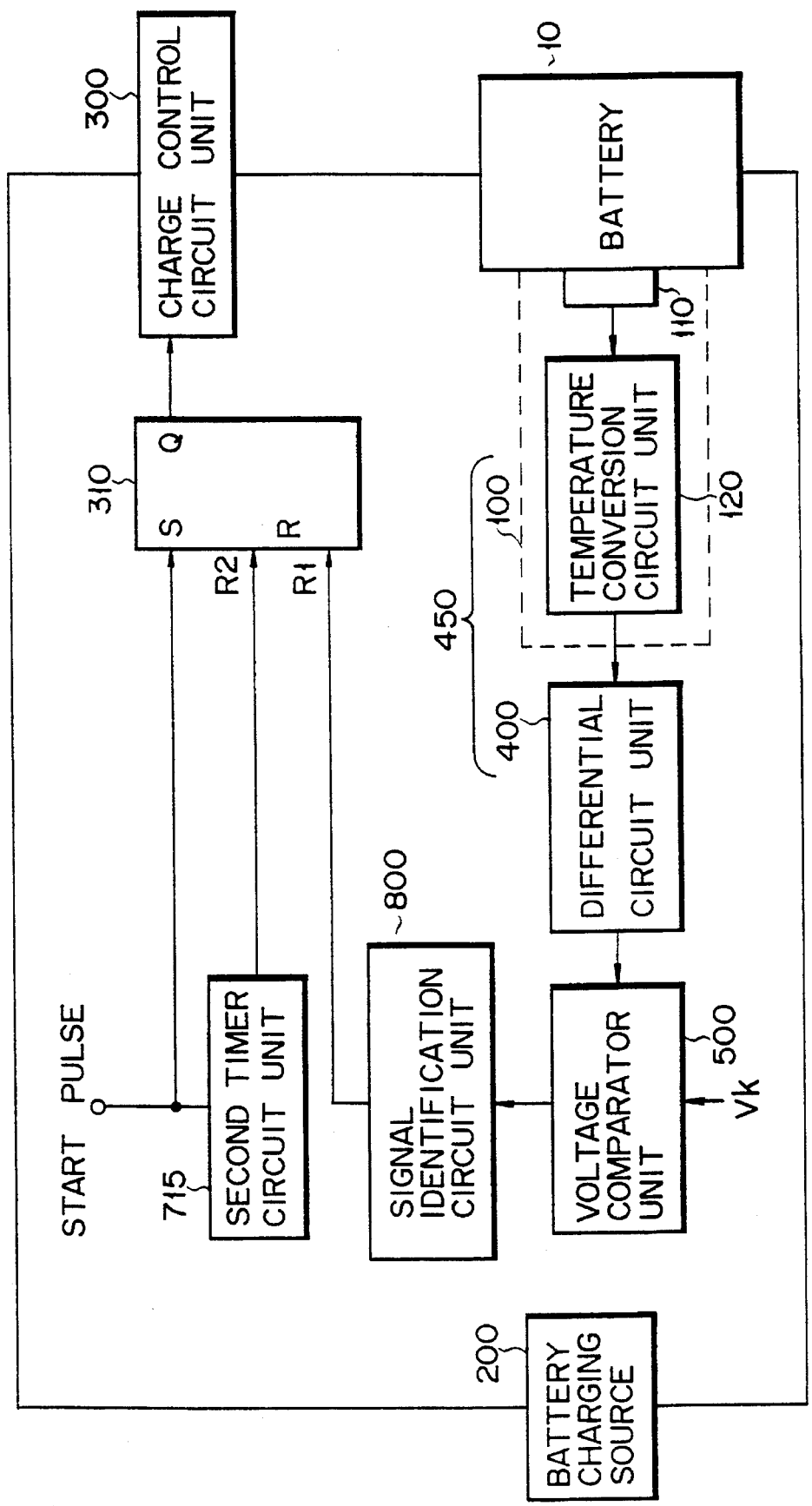
F I G. 11

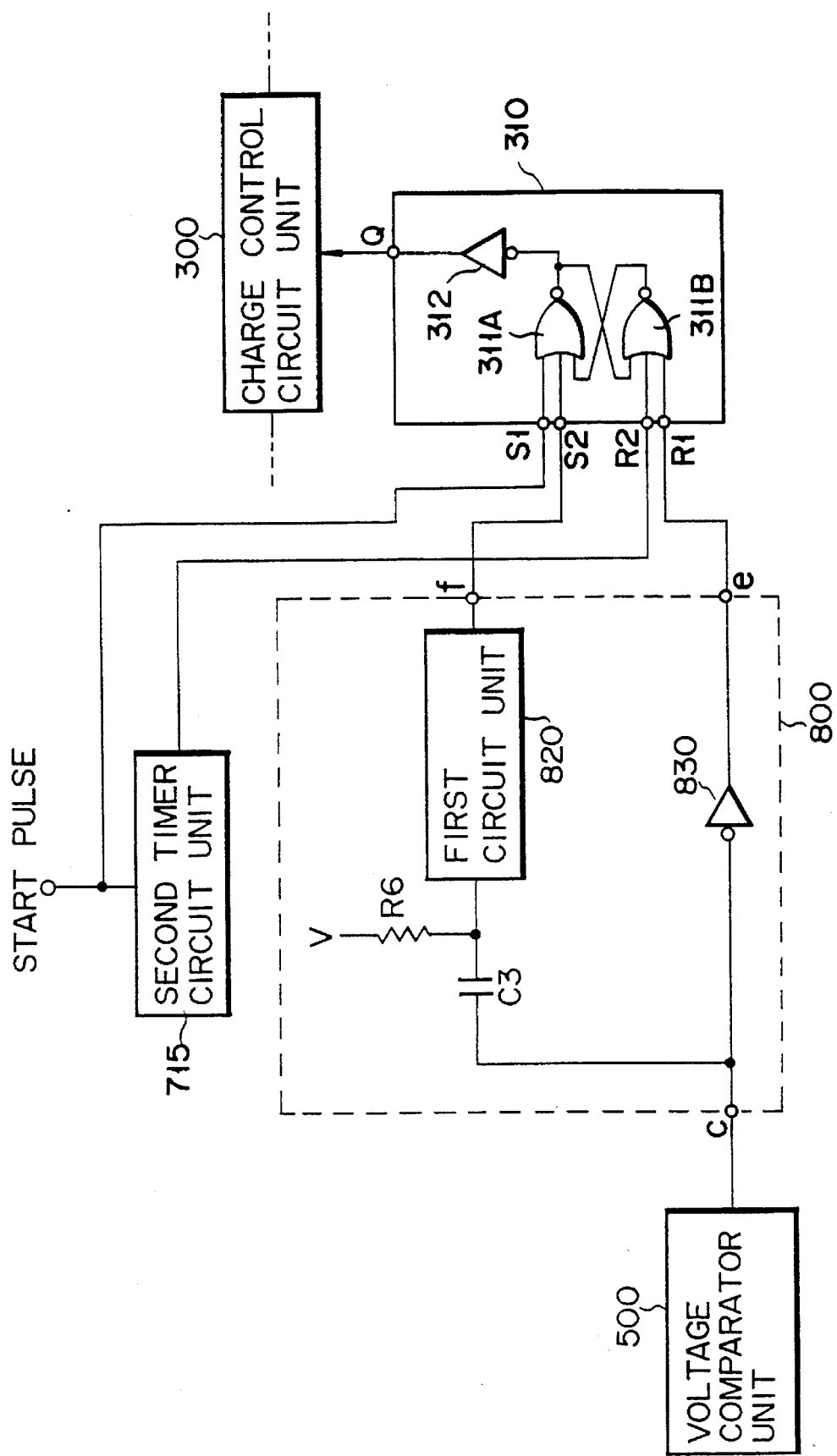
F I G. 14

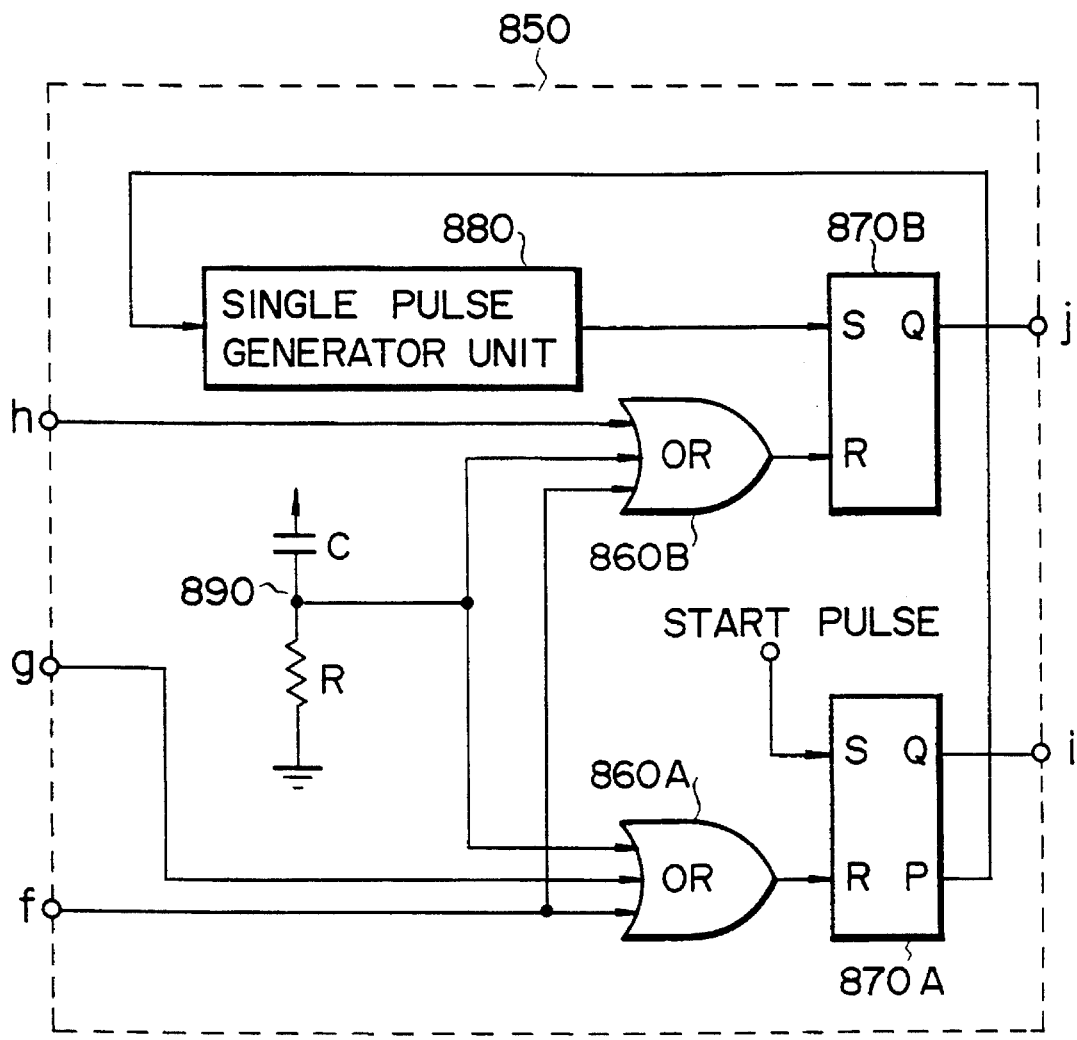
F I G. 16

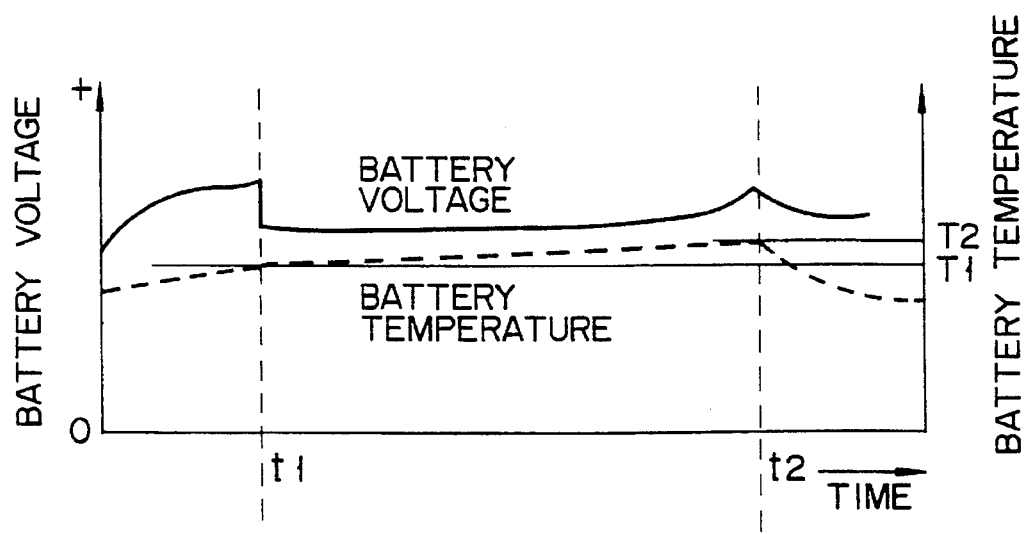
F I G. 18A
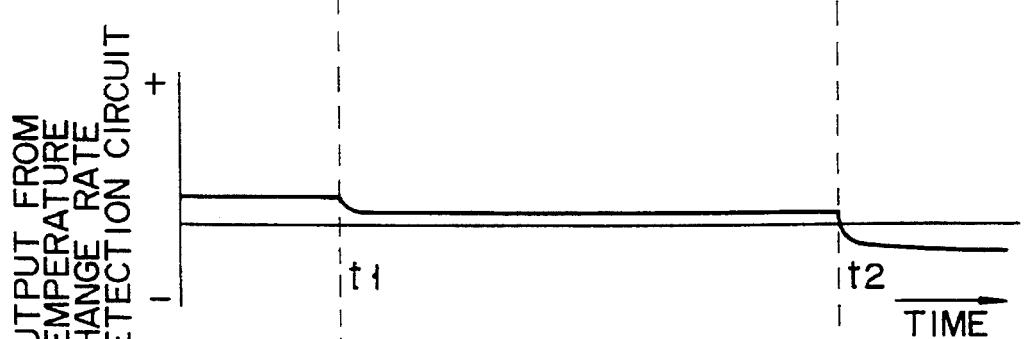
F I G. 18B
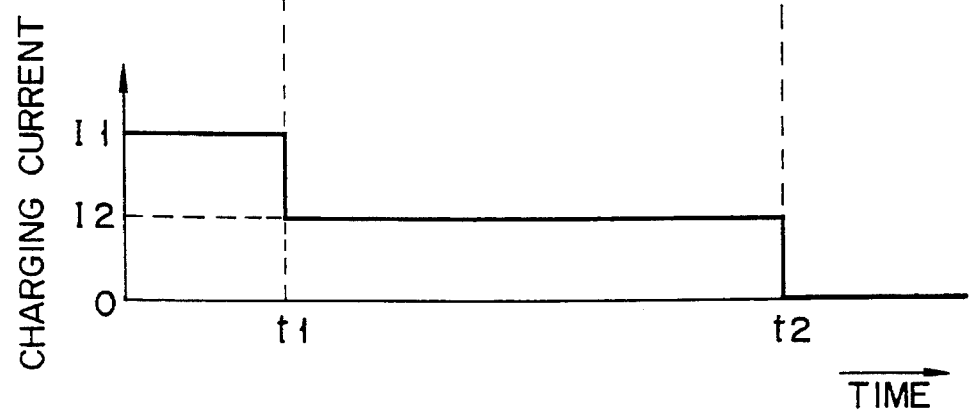
F I G. 18C

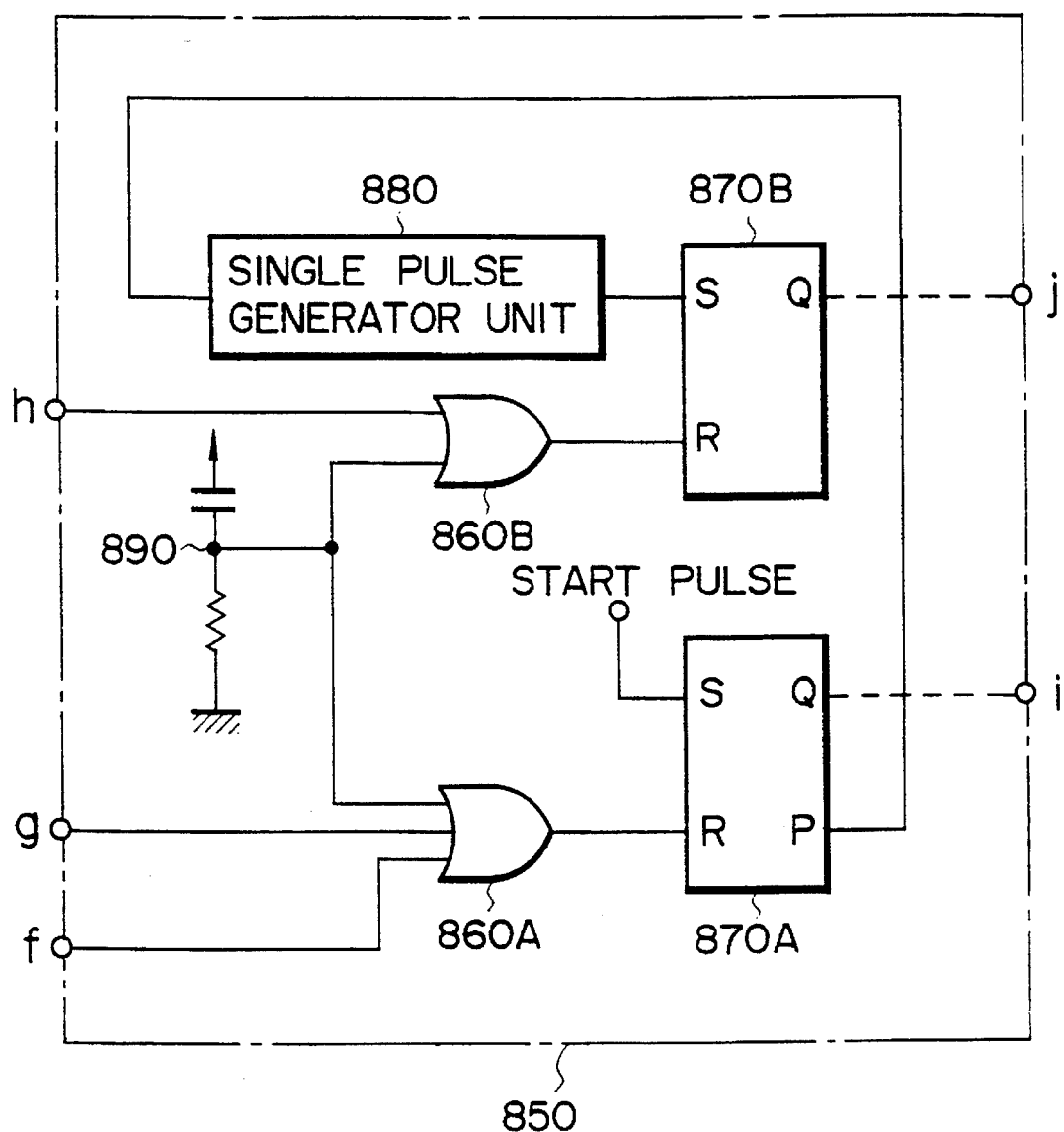
F I G. 19

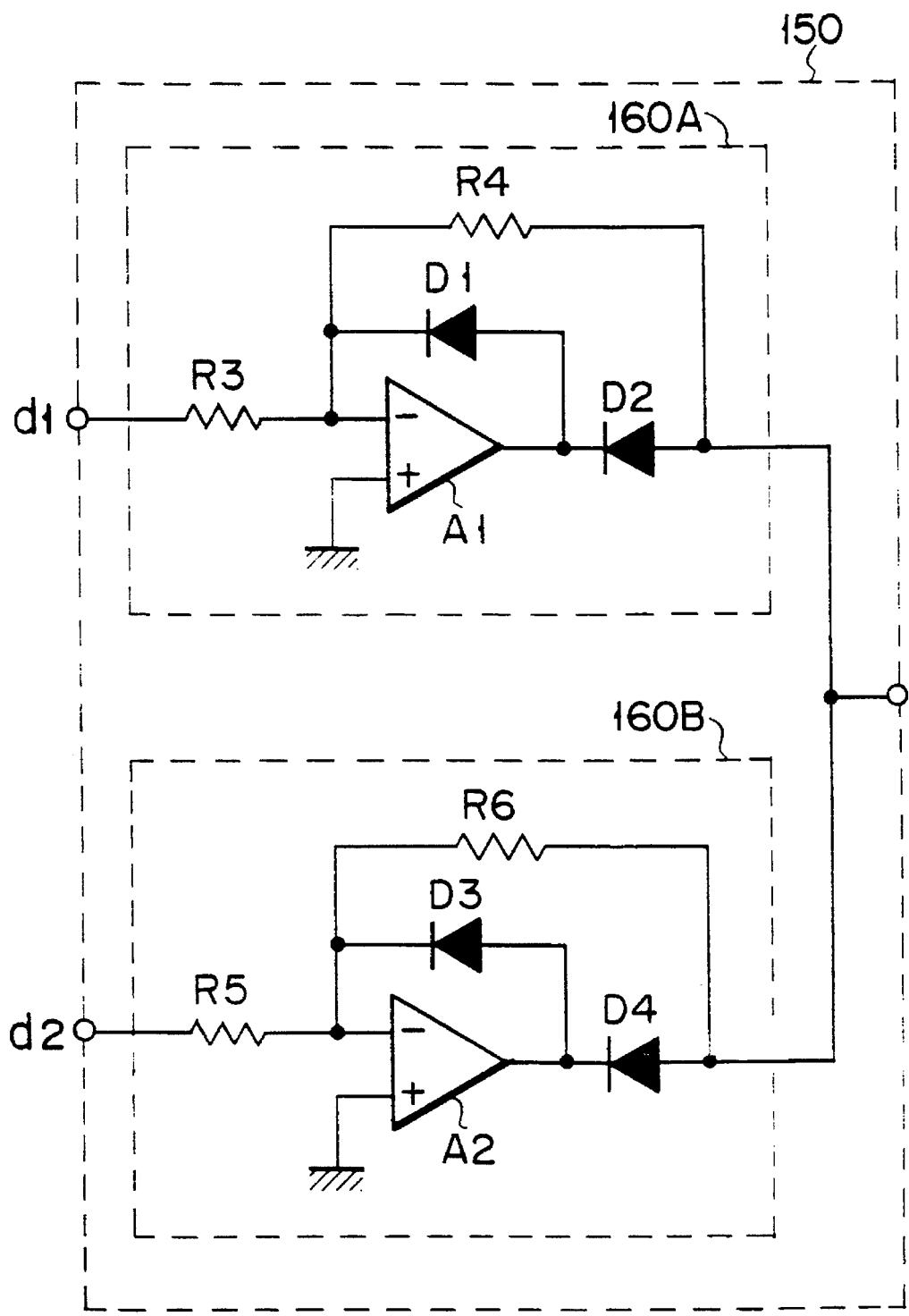
F I G. 23

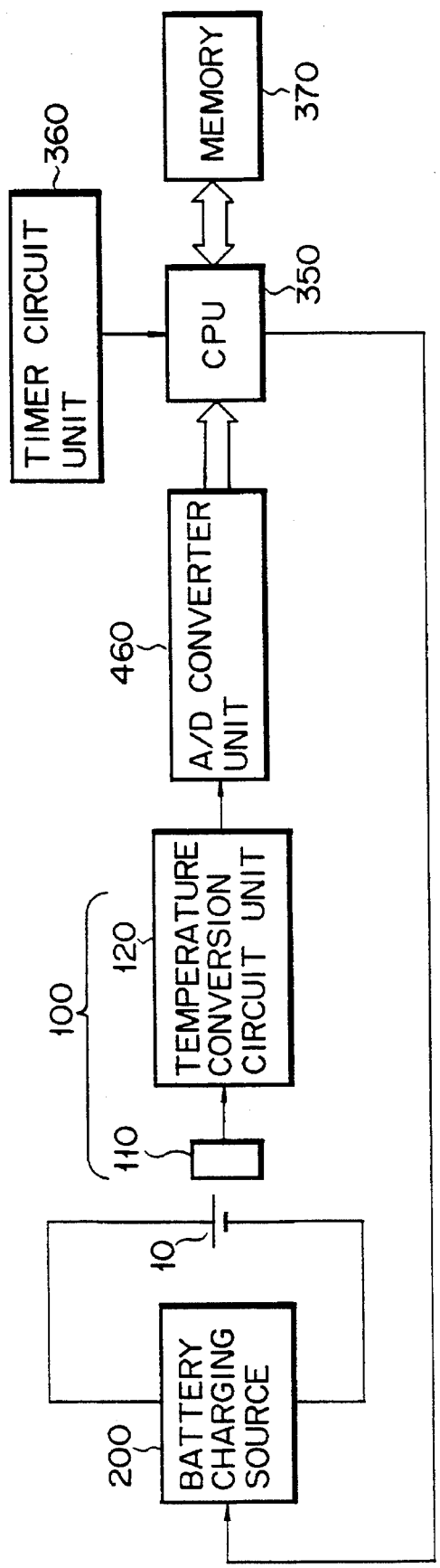
F I G. 25
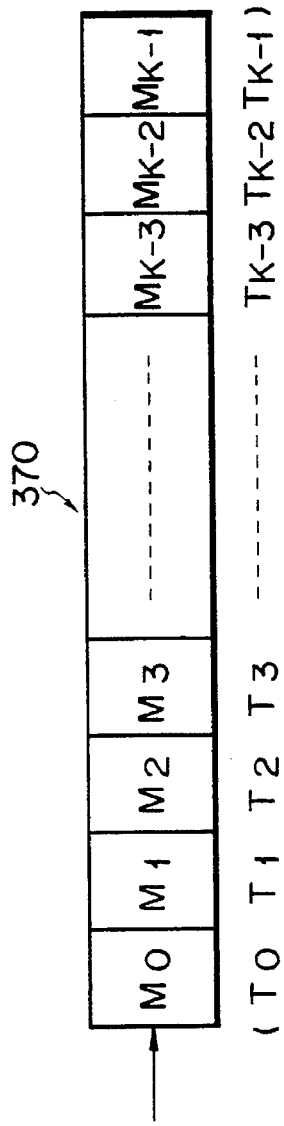
F I G. 26

SECONDARY BATTERY CHARGING CIRCUIT

This is a division of application Ser. No. 07/775,755, filed on Oct. 15, 1991 now U.S. Pat. No. 5,391,974.

BACKGROUND O THE INVENTION

1. Field of the Invention

The present invention relates to a secondary battery charging circuit and, more particularly, to a charging circuit which employs a system for controlling a charging operation by detecting the temperature of a secondary battery upon a charging operation.

2. Description of the Related Art

As a system for charging a secondary battery within a short period of time, it is generally used as following system. when charging is controlled at a voltage flowing to $\Delta V$ from a peak voltage charged by fast charging, a secondary battery is charged up to 110% to 120%. On the other hand, when charging is controlled by detecting a battery temperature using in this invention, a secondary battery is charged up to almost 90% of an electrical capacity of the secondary battery by fast charging, and thereafter, the remaining capacity of that is charged by a quick or trickle charging operation. The most serious problem in this system is determination of a stop timing of fast charging. When the fast charging operation is unnecessarily continued, the battery temperature is extremely increased. As a result, the battery is considerably loaded, thus shortening the service life of the battery.

Thus, various charging circuits for detecting a point where the temperature of a secondary battery is abruptly increased, and stopping a fast charging operation have been proposed.

As one of charging circuits utilizing the above-mentioned system, a system, which utilizes characteristics in that the temperature of a secondary battery is increased in the final period of charging, for detecting the temperature of a secondary battery by a temperature sensor, and controlling a charging operation on the basis of the detection result is known. Examples of this system are as follows.

1) A charging circuit for performing fast charging when the temperature of a secondary battery is within a predetermined range, and a time differential value of temperature is equal to or lower than a predetermined value. In this charging circuit, when the temperature of the secondary battery falls within a predetermined range, and the rate of change in temperature is equal to or smaller than a predetermined value, a fast charging current is supplied.

2) A charging circuit for ending charging when the temperature gradient changes from a negative value or 0 to a positive value. This charging circuit has a temperature monitor circuit for monitoring a temperature rise in accordance with a signal from a temperature sensor incorporated in a battery, and controlling the charging circuit. when the temperature of the battery is abnormally increased, the temperature monitor circuit detects the abnormality of the battery temperature, and controls the charging circuit, thereby preventing overcharging.

3) A charging circuit for detecting the temperature of a secondary battery so as to detect a point where the temperature of the secondary battery is abruptly increased, for comparing the present detection temperature and a temperature detected a predetermined period of time before, for, when the difference (temperature differential value) reaches a given positive value, determining that fast charging is completed. More specifically, an output signal from a temperature sensor is converted into a digital value by an A/D converter to obtain temperature data, and digital calculations are performed to make the above-mentioned decision.

However, when a temperature sensor causes an error, or when a connection error between the temperature sensor and an electronic circuit occurs, the temperature sensor cannot supply a normal temperature detection result to the electronic circuit, and charging end control of the secondary battery can no longer be performed. As a result, the secondary battery is overcharged, and its temperature is abnormally increased. Thus, the battery itself or equipment which uses this battery may be damaged.

In the second example, when a battery such as a nickel-hydrogen battery which generates heat from the beginning of charging, and whose temperature is slightly increased along with charging is to be charged, the temperature gradient turns to a positive value after the battery is charged only slightly, and the charging operation is ended, resulting in a considerable short charging state. when the fast charging operation of the above-mentioned secondary battery is performed when ambient temperature is high, the battery temperature exceeds a predetermined value before the end of charging, and the charging operation is undesirably ended. As a result, the same state as described above may occur.

Furthermore, even when the fast charging operation is started by, e.g., a switch after the power switch of the charging circuit is turned on, noise components generated by an abrupt change in charging current are mixed in, e.g., a differential circuit, and the same erroneous operation as described above may occur.

Since the conventional charging circuit has only one temperature sensor, when a plurality of batteries connected in series with each other are to be charged, a change in temperature of one of the batteries is detected by the temperature sensor to control the charging operation. Therefore, if the batteries include a secondary battery (to be referred to as a battery B hereinafter) having a smaller electrical capacity than that of a secondary battery (to be referred to as a battery A hereinafter) to which the temperature sensor is attached, charge control is not started even when the temperature of the battery B is increased. Only when the temperature of the battery A is increased, and the increase in temperature is detected by the temperature monitor circuit, charge control is started. Therefore, the battery B is overcharged. In particular, when the difference between the electrical capacities of the batteries A and B is large, and the batteries A and B are thermally separated from each other, the overcharging amount of the battery is increased. As a result, the battery B causes an abnormal temperature rise, and may be damaged, or equipment which uses the battery B may be damaged.

As described above, when the charging circuit has only one temperature sensor for detecting the temperature of the secondary battery, and when batteries connected in series with each other are to be charged, if the batteries include a secondary battery having a smaller electrical capacity than that of a secondary battery to which the temperature sensor is attached, the battery having the smaller electrical capacity is undesirably overcharged.

In the third method, if, for example, an A/D converter included in a measurement system has a low resolution, a temperature differential value cannot be precisely obtained. More specifically, if the resolution is low, since a small change in temperature of the secondary battery cannot be detected, a point where the temperature is abruptly increased in the final period of charging cannot often be detected. As a result, the stop timing of the fast charging operation is delayed, and the battery is undesirably overloaded. It is preferable to use a 16-bit A/D converter. However, a high-resolution A/D converter is expensive, and it is difficult to use such an A/D converter in a charging circuit included in electronic equipment such as a personal computer, a personal wordprocessor, or the like in view of cost.

As described above, in the conventional charging circuit which measures, as a temperature differential value, a difference between the present detection temperature of the secondary battery and a temperature detected a predetermined period of time before, and for, when the temperature differential value reaches a predetermined value, stopping the fast charging operation, if the A/D converter or the like in the measurement system has a low resolution, an abrupt increase in temperature of the secondary battery in the final period of charging cannot be detected, resulting in overcharging.

References which describe the above-mentioned related arts are as follows:
1) U.S. Pat. No. 3,852,562 (Published Unexamined Japanese patent Application No. 50-44432)
2) U.S. Pat. No. 4,006,397 (Examined Japanese Patent Publication No. 56-16631)
3) U.S. Pat. No. 4,045,720
4) U.S. Pat. No. 4,065,712
5) U.S. Pat. No. 4,052,656
6) U.S. Pat. No. 4,670,703
7) U.S. Pat. No. 4,888,544
8) Published Unexamined Japanese Patent Application No. 52-112741
9) Published Unexamined Japanese Patent Application No. 61-161926
10) Published Unexamined Japanese Patent Application No. 61-221538
11) Published Unexamined Japanese Patent Application No. 62-193518
12) Published Unexamined Japanese Patent Application No. 63-76275
13) Published Unexamined Japanese Patent Application No. 1-138931
14) Published Unexamined Japanese Patent Application No. 1-185135
15) Published Unexamined Japanese Patent Application No. 1-186128
16) Published Unexamined Japanese Utility Model Application No. 3-34638

SUMMARY OF THE INVENTION

It is an object of the present invention to provide a secondary battery charging circuit having high reliability and safety. The present invention has the following seven aspects.

(1) Even when a temperature detection system for a secondary battery cannot be normally operated, the secondary battery and equipment can be prevented from being damaged, and even when a secondary battery which generates heat from the beginning of charging, and whose temperature is slightly increased along with charging is to be charged, a proper charging operation can be performed.

(2) A battery can always be charged by a proper amount without causing a short charging state caused by an erroneous operation due to a temperature rise based on self-heating of a temperature sensor immediately after the beginning of fast charging, an unstable output from an electronic circuit, or mixing of noise due to an abrupt change in charging current.

(3) A battery can always be charged by a proper amount without causing an erroneous operation due to a temperature rise based on self-heating of a temperature sensor immediately after the beginning of fast charging, an unstable output from a differential circuit immediately after power-on, mixing of electrical noise into, e.g., a differential circuit during charging, or a change in ambient temperature or air current when a thermal resistance between a temperature sensor and ambient temperature is small.

(4) Even when ambient temperature is high, a battery can be charged to almost 100% of its capacity within a short period of time.

(5) When a charging operation of a plurality of secondary batteries connected in series with each other is controlled on the basis of the temperature of the batteries, an overcharging state can be prevented even if the secondary batteries have various electrical capacities.

(6) An abrupt increase in temperature of a secondary battery in the final period of charging can be reliably detected using an A/D converter having a relatively low resolution in a measurement system, and a fast charging operation can be stopped at a proper timing.

(7) A fast charging mode, a quick charging mode, and a trickle charging mode are sequentially switched in accordance with a predetermined rate of change in temperature, a predetermined temperature, and a predetermined period of time. Thus, a battery can be charged to almost 100% of its capacity within a short period of time. After an elapse of the predetermined period of time, the charging method is forcibly switched, or the charging operation is ended, thus preventing overcharging.

A secondary battery charging circuit according to the first aspect of the present invention is characterized by comprising a charging source for supplying a charging current to a secondary battery temperature detection unit for generating an output which changes almost linearly with respect to a change in temperature of the secondary battery during a charging operation, differential unit for obtaining a differential value of the output from the temperature detection unit, comparator unit for comparing the differential value during the charging operation and a setting value, and for, when the relationship between the differential value and the setting value is reversed, generating an inverted output, timer circuit unit, started simultaneously with start of the charging operation of the secondary battery, for generating a timer output after an elapse of a predetermined period of time, and charge control unit for controlling the charging operation of the secondary battery on the basis of one, generated earlier, of the inverted output from the comparator unit and the timer output from the timer circuit unit.

In a secondary battery such as a nickel-hydrogen battery, in the initial or middle period of charging, the amount of heat generated inside the battery is small, and an increase in temperature of the secondary battery is small. However, in the final period of charging, the amount of heat generated inside the battery is abruptly increased, and a surface temperature is increased until heat generation is balanced with heat radiation. The rate of increase in temperature in the final period of charging becomes larger as the charging current is larger. However, the rate of increase in temperature is not so influenced by ambient temperature.

According to the first aspect of the present invention, the charging circuit comprises the temperature detection unit whose output almost linearly changes in accordance with a change in temperature of the secondary battery, the differential unit for obtaining a differential value of an output from the temperature detection unit, the comparison unit for comparing the differential value during charging and a setting value, and for, when the relationship between the differential value and the setting value is re versed, generating an inverted output, and the timer circuit which is started when a charging operation of the secondary battery is started, and generates a timer output after an elapse of a predetermined period of time. The charging operation of the secondary battery is controlled on the basis of one, which is output earlier, of the inverted output from the comparison unit and the timer output from the timer circuit. Thus, the charging operation is normally controlled by the output from the comparison unit, and even when a temperature detection system including a temperature sensor, the differential unit and the comparison unit are defective, or when a connection error occurs among these units, charge control can be performed on the basis of a timer output from the timer circuit.

Therefore, an abnormal increase in temperature due to overcharging of the secondary battery can be prevented, and hence, the battery and equipment using the battery can be prevented from being damaged, thus improving reliability and safety.

A secondary battery charging circuit according to the second aspect of the present invention is characterized by comprising a charging source for supplying a charging current to a secondary battery, temperature change rate detection unit for detecting a rate of change in temperature of the secondary battery during a charging operation, comparator unit for comparing an output value from the temperature change rate detection unit during the charging operation with a setting value, and for, when the relationship between the output value and the setting value is reversed, generating an inverted output, charge control unit for starting the charging operation of the secondary battery in response to a charge start signal, and controlling the charging operation of the secondary battery on the basis of the inverted output from the comparator unit, and charge control inhibition unit for inhibiting charge control by the charge control unit for a predetermined period of time from the beginning of the charging operation of the secondary battery.

According to the second aspect of the present invention, the charging circuit comprises the temperature change rate detection unit for detecting a rate of change in temperature of the secondary battery with respect to time, the comparison unit for comparing the output value from the temperature charge rate detection unit during charging and a setting value, and for, when the relationship therebetween is reversed, generating an inverted output, and the charge control unit for starting a charging operation of the secondary battery in response to a charging start signal, and controlling the charging operation of the secondary battery in accordance with the inverted output from the comparison unit. In this charging circuit, since the charge control based on the inverted output from the comparison unit is inhibited for a predetermined period of time from the beginning of charging of the secondary battery, an erroneous operation caused by an increase in temperature due to self-heating of a temperature sensor when an arrangement for starting fast charging simultaneously with power-on of the charging circuit is employed, or caused by an unstable output immediately after power-on when an analog differential circuit is used in detection of the rate of change in temperature, can be prevented. Furthermore, an erroneous operation caused by noise generated upon an abrupt change in charging current at the beginning of charging can also be prevented, and the battery can always be charged by a proper amount without causing a short charging state.

A secondary battery charging circuit according to the third aspect of the present invention is characterized by comprising a charging source for supplying a charging current to a secondary battery, temperature change rate detection unit for detecting a rate of change in temperature of the secondary battery during a charging operation, comparator unit for, when a relationship between an output from the temperature change rate detection unit during the charging operation and a predetermined setting value is reversed, generating a comparison output, charge control unit for controlling the charging operation of the secondary battery in accordance with the comparison output, and signal identification unit for inhibiting charge control for a predetermined period of time after the comparator unit generates the comparison output.

According to the third aspect of the present invention, the charging circuit comprises the temperature change rate detection unit for detecting a rate of change in temperature of the secondary battery with respect to time, the comparison unit for comparing the output value from the temperature charge rate detection unit during charging and a setting value, and for, when the relationship therebetween is reversed, generating a comparison output, and the charge control unit for starting a charging operation of the secondary battery in response to a charging start signal, and controlling the charging operation of the secondary battery in accordance with the comparison output from the comparison unit. In this charging circuit, since charge control is inhibited by the signal identification unit for a predetermined period of time after the comparison unit outputs the comparison output, an erroneous operation caused by an increase in temperature due to self-heating of a temperature sensor when an arrangement for starting fast charging simultaneously with power-on of the charging circuit is employed, an erroneous operation caused by an unstable output immediately after power-on of a differential circuit, and an erroneous operation caused by mixing of electrical noise in, e.g., the differential circuit during charging or a change in ambient temperature or air current can be prevented, and the battery can always be charged by a proper amount. As a result, a charging operation can be performed with high reliability and safety.

A secondary battery charging circuit according to the fourth aspect of the present invention is characterized by comprising a first charging source for supplying a charging current to a secondary battery, a secondary charging source for supplying a charging current smaller than the charging current supplied from the first charging source to the secondary battery, switching unit for connecting the first charging source to the secondary battery during a first charging period, and connecting the second charging source to the secondary battery during a second charging period, first temperature detection unit for detecting that a temperature of the secondary battery has reached a first setting temperature, and generating a detection output, second temperature detection unit for detecting that a temperature of the secondary battery has reached a second setting temperature, and generating a detection output, temperature change rate detection unit for detecting a rate of change in temperature of the secondary battery with respect to time, comparator unit for comparing an output value from the temperature change rate detection unit during a charging operation to the secondary battery with a setting value, and for, when the output value reaches the setting value, generating an inverted output, and control unit for controlling a change of charging methods, and stop of the charging operation.

The control unit has at least one of units realizing the following three modes.

(1) When the inverted output from the comparator unit is generated during the first charging period, the control unit ends the first charging period so as not to substantially start the second charging period, and when the detection output from the first temperature detection unit is generated during the first charging period, the control unit starts the second charging period, and ending the second charging period in response to one, generated earlier, of the detection output from the second temperature detection unit and the inverted output from the comparator unit during the second charging period.

(2) The control unit starts the second charging period in response to one, generated earlier, of the detection output from the first temperature detection unit and the inverted output from the comparator unit during the first charging period, and ends the second charging period in response to one, generated earlier, of the detection output from the second temperature detection unit and the inverted output from the comparator unit during the second charging period.

(3) The control unit starts the second charging period in response to one, generated earlier, of the detection output from the first temperature detection unit and the inverted output from the comparator unit during the first charging period, and ends the second charging period in response to the detection output from the second temperature detection unit.

A secondary battery, e.g., a nickel-hydrogen battery slightly generates heat, and its temperature is increased in the initial or middle period of charging. In the final period of charging, the amount of heat generated inside the battery is abruptly increased, and the surface temperature is increased until heat generation is balanced with heat radiation. As the charging current is increased, the rate of increase in temperature not only in the final period of charging but also in the initial or middle period of charging is increased. In particular, when fast charging is performed when ambient temperature is high, the battery temperature is abnormally increased.

However, there is a time delay until heat generated inside the battery reaches the battery surface, and there is also a time delay in response of a temperature sensor such as a thermistor for detecting the battery temperature. For this reason, as the charging current becomes larger, a lower temperature for stopping fast charging must be set. For this reason, when ambient temperature is high, a short charging state often occurs.

In the fourth aspect of the present invention, the battery temperature is detected via the temperature sensor incorporated in or arranged adjacent to the secondary battery, and in, e.g., the first mode, when the rate of increase in temperature of the secondary battery reaches a setting value during a first charging period by a first charging source as a fast charging source, the second charging period is set to be zero or almost zero, thus substantially inhibiting the start of a second charging period. When the battery temperature reaches a first setting temperature during the first charging period, the second charging period by a second charging source as a quick charging source is started to perform quick charging. Thereafter, when the battery temperature reaches a second setting temperature or when the rate of increase in temperature reaches the setting value, the second charging period is ended, thus ending the quick charging. After the quick charging is ended, for example, trickle charging is started.

In the second mode, during the first charging period, when the battery temperature reaches the first setting temperature or when the rate of increase in temperature reaches the setting value, the second charging period is started, and during the second charging period, when the battery temperature reaches the second setting temperature or the rate of increase in temperature reaches the setting value, the second charging period is ended.

In the third mode, during the first charging period, when the battery temperature reaches the first setting temperature or when the rate of increase in temperature reaches the setting value, the second charging period is started, and when the battery temperature reaches the second setting temperature, the second charging period is ended.

With the above-mentioned charge control, even when the battery temperature reaches the first setting temperature within a short period of time like in a case wherein fast charging is performed when ambient temperature is high, quick charging is performed with a current smaller than that in the fast charging until the battery temperature reaches the second setting temperature higher than the first setting temperature or the rate of increase in temperature of the battery reaches the setting value. Therefore, 100% charging can be performed within a short period of time. When the rate of increase in temperature reaches the setting value in the fast charging, or when the battery temperature reaches the second setting temperature in the quick charging, the charging operation is immediately ended. For this reason, overcharging can be prevented, and the secondary battery or equipment using the battery can be prevented from being damaged.

Therefore, even when ambient temperature is high, charging up to almost 100% of the capacity can be performed within a short period of time, and an abnormal increase in battery temperature can be prevented, thus prolonging the service life of the battery. Furthermore, the secondary battery or equipment using the battery can be prevented from being damaged, thus improving reliability and safety.

A secondary battery charging circuit according to the fifth aspect of the present invention is characterized by comprising a charging source for supplying a charging current to a secondary battery, at least two temperature sensors for detecting a temperature of the secondary battery, and generating output signals corresponding to the detected temperature, at least two temperature detection unit for respectively receiving the output signals from the at least two temperature sensors, and for, when the detected temperature of the corresponding temperature sensor reaches a setting value, generating a detection output, and control unit for controlling a charging operation of the secondary battery in response to a detection output, generated earlier, of the detection outputs from the at least two temperature detection unit.

According to the fifth aspect of the present invention, since the plurality of temperature sensors are arranged, when a plurality of secondary batteries are connected in series with each other, the temperatures of the batteries can be individually detected. Therefore, since charge control of the secondary batteries is performed in response to a detection output, generated earliest, of detection outputs generated when temperatures detected by the plurality of temperature sensors reach a setting value, overcharging can be prevented even when the plurality of secondary batteries have various electrical capacities.

An output corresponding to one, corresponding to a highest detection temperature, of detection outputs which almost linearly change with respect to changes in detection temperature of the temperature sensors may be output, and charge control of the secondary battery may be performed when the output reaches a setting value. Thus, overcharging can be similarly prevented.

Furthermore, even when one secondary battery, in particular, a battery having a large electrical capacity, is to be charged, the temperature in the final period of charging varies depending on the mounting position of the temperature sensor. In this case, overcharging can be prevented according to the present invention.

Therefore, charging can be performed without damaging the secondary battery or equipment using the battery, thus improving reliability and safety.

A secondary battery charging circuit according to the sixth aspect of the present invention is characterized by comprising a charging source for supplying a charging current to a secondary battery, temperature detection unit for detecting a temperature of the secondary battery, and outputting an electrical signal corresponding to the detected temperature, analog-to-digital conversion unit for converting an output signal from the temperature detection unit into a digital value, and outputting the digital value as temperature data, storage unit for sequentially storing a plurality of temperature data at a predetermined time interval output from the analog-to-digital conversion unit while updating old temperature data, and control unit for, when the number of temperature data corresponding to differences between one of latest temperature data and oldest temperature data and the remaining temperature data of the plurality of temperature data stored in the storage unit, which differences exceed a predetermined value, reaches a predetermined number, decreasing the charging current from the charging source.

According to the sixth aspect of the present invention, since the temperature of the secondary battery is gradually increased in the initial period of charging, a difference between latest or oldest temperature data and other temperature data of a plurality of temperature data corresponding to battery temperatures stored in a storage unit is small. When the charging operation progresses, and reaches the final period of charging, since the temperature of the secondary battery is abruptly increased, the difference is abruptly increased, and the number of temperature data, in which the differences exceed a predetermined value, is increased accordingly. Therefore, when the number of such temperature data reaches a predetermined value, it can be reliably determined that the final period of charging has been reached. At that time, fast charging is stopped, and the charging current is decreased. As a result, charging up to almost 100% of the capacity can be performed without causing overcharging.

Furthermore, even when an A/D converter having a relatively low resolution is used in measurement of temperature data, the end of fast charging can be reliably determined. Therefore, cost of the charging circuit can be reduced.

A secondary battery charging circuit according to the seventh aspect of the present invention is characterized by comprising a first charging source for supplying a charging current to a secondary battery, a second charging source for supplying a charging current smaller than the charging current from the first charging source to the secondary battery, a third charging source for supplying a charging current smaller than the charging current from the second charging source to the secondary battery, switching unit for connecting the first charging source to the secondary battery during a first charging period, connecting the second charging source to the secondary battery during a second charging period, and connecting the third charging source to the secondary battery during a third charging period, first temperature detection unit for detecting that a temperature of the secondary battery has reached a first setting temperature $T_1$, and generating a detection output, second temperature detection unit for detecting that the temperature of the secondary battery has reached a second setting temperature $T_2$ higher than the first setting temperature $T_1$, and generating a detection output, third temperature detection unit for detecting that the temperature of the secondary battery has reached a third setting temperature $T_3$ higher than the second setting temperature $T_2$, and generating a detection output, temperature change rate detection unit for detecting a rate of change in temperature of the secondary battery with respect to time, comparator unit for comparing an output value from the temperature change rate detection unit during a charging operation to the secondary battery with a setting value, and for, when the output value reaches the setting value, generating an inverted output, a first timer means started simultaneously with start of the first charging period, a second timer mean started simultaneously with start of the second charging period, a third timer unit started simultaneously with start of the third charging period, control unit for starting the second charging period in response to one, generated earliest, of the inverted output from the comparator unit, the detection output from the first temperature detection unit, and a timer output from the first timer during the first charging period, starting the third charging period in response to one, generated earliest, of the inverted output from the comparator unit, the detection output from the second temperature detection unit, and a timer output from the second timer during the second charging period, and ending the third charging period in response to one, generated earlier, of the detection output from the third temperature detection unit and a timer output from the third timer during the third charging period, and charge control inhibition unit for inhibiting charge control upon generation of the inverted output for a predetermined period of time from the beginning of each of the first and second charging periods.

After the charging operation is started, a battery test is executed. When no battery abnormality is detected, fast charging is started. when an abnormality is detected in the battery, the charging operation is stopped. The abnormality of the battery is detected when a battery voltage is abnormally low or high, or when ambient temperature is abnormally low. After the fast charging is started, the fast charging is ended when one of the following three conditions is satisfied, and thereafter, quick charging is started.

1) The rate of change in battery temperature exceeds a setting value.

2) The battery temperature exceeds a setting temperature.

3) A setting time of a timer elapses.

After the quick charging is started, the quick charging is ended under the same conditions as the end conditions of the fast charging, and thereafter, trickle charging is started. In this case, the end conditions of the quick charging may be set independently of those of the fast charging.

The trickle charging is ended based on the battery temperature and the setting time of the timer. The time of the timer may be independently set. In this case, the upper limit value of the battery temperature may use an upper limit setting value for fast charging and quick charging. For example, the upper limit value of trickle charging may be given by:

(Temperature Upper Limit Setting Value of Trickle Charging)=2× (Temperature Upper Limit Setting Value of Quick Charging)− (Temperature Upper Limit Setting Value of Fast Charging)

In this manner, a control circuit can be simplified.

According to the seventh aspect of the present invention, the end timing of fast charging and quick charging is determined on the basis of the rate of change in temperature and the upper limit value of the temperature, and the end timing of trickle charging is determined on the basis of the upper limit value of the temperature. Therefore, since respective charging steps can be reliably performed upon detection of the temperature and a change in temperature, proper charging can always be performed. Furthermore, even when an abnormality of a temperature detection circuit, a temperature conversion circuit, or the like occurs, since the end timing of each step can be controlled by the timer, safety and reliability can be guaranteed.

As described above, according to the secondary battery charging circuits of the first to seventh aspects of the present invention, a secondary battery can always be charged by a proper amount, and a charging operation can be performed with high reliability and safety.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a circuit diagram showing a detailed arrangement of a temperature conversion circuit unit shown in FIG. 1;

FIG. 3 is a circuit diagram showing a detailed arrangement of a differential circuit unit shown in FIG. 1;

FIG. 4 is a circuit diagram showing a modification of the temperature conversion circuit unit shown in FIG. 2;

FIGS. 7A and 7B are graphs showing charging characteristics for explaining an operation of the circuit shown in FIG. 6;

FIG. 8 is a circuit diagram of principal part in the first modification of the second embodiment;

FIG. 9 is a circuit diagram of principal part in the second modification of the second embodiment;

FIG. 10 is a circuit diagram of principal part in the third modification of the second embodiment;

FIG. 11 is a block diagram showing an arrangement of a secondary battery charging circuit according to the third embodiment of the present invention;

FIG. 14 is a block diagram showing another detailed arrangement of a signal identification circuit unit;

FIG. 16 is a circuit diagram showing a detailed arrangement of a signal identification circuit unit shown in FIG. 15;

FIGS. 18A to 18C are waveform charts for explaining operations at high temperature in the fourth embodiment;

FIG. 19 is a circuit diagram showing a modification of a control circuit unit in the fourth embodiment of the present invention;

FIG. 23 is a circuit diagram showing a detailed arrangement of a signal processing circuit unit shown in FIG. 22;

FIG. 25 is a circuit diagram showing an arrangement of a secondary battery charging circuit according to the sixth embodiment of the present invention;

FIG. 26 shows in detail a map of a memory shown in FIG. 25;

DETAILED DESCRIPTION OF THE PREFERRED EMBODIMENTS

The preferred embodiments of the present invention will be described hereinafter with reference to the accompanying drawings.

Figure 1:
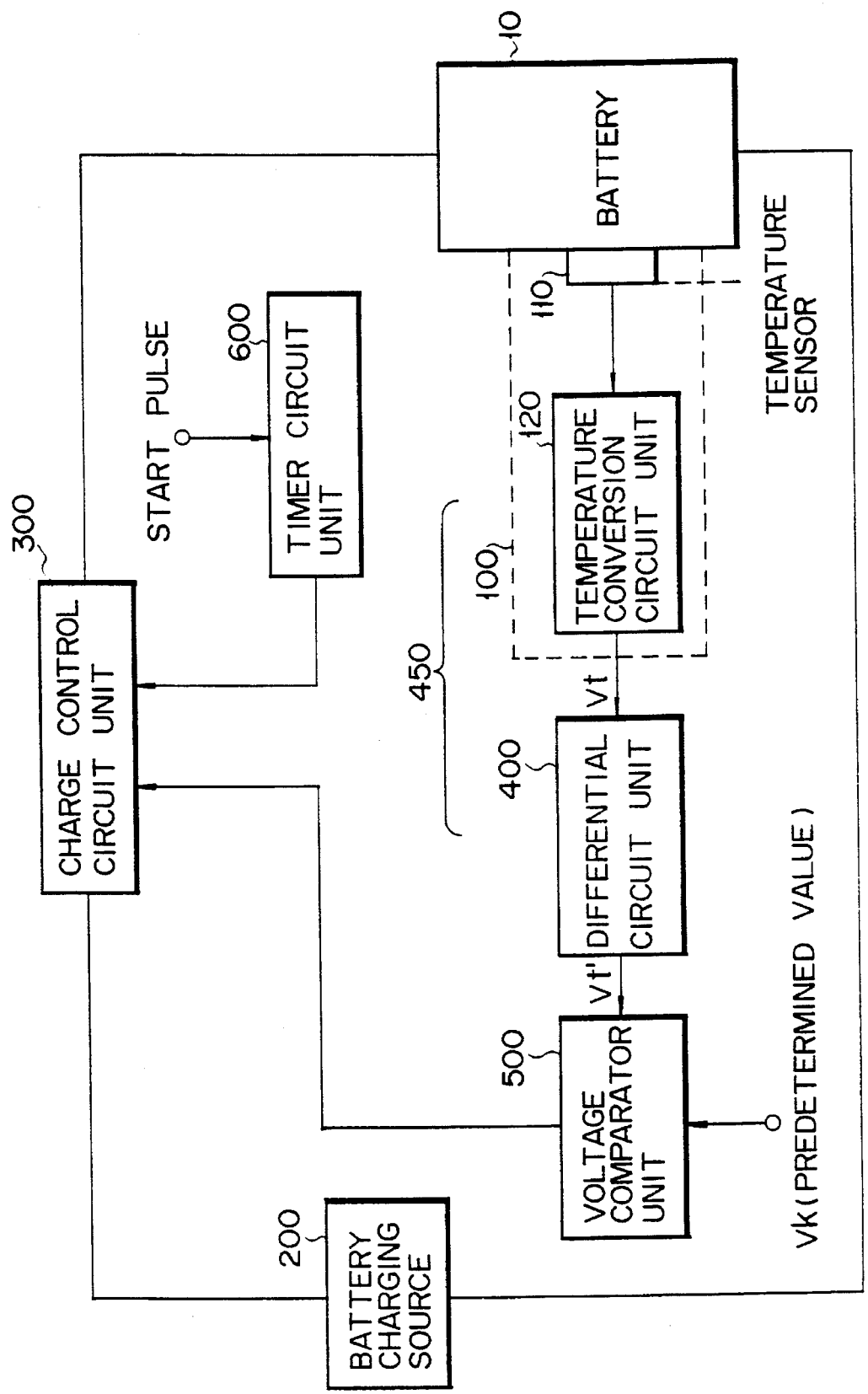
FIG. 1 is a block diagram showing an arrangement of a secondary battery charging circuit according to the first embodiment of the present invention.

FIG. 1 is a block diagram showing an arrangement of a secondary battery charging circuit according to the first embodiment of the present invention.

In FIG. 1, the secondary battery charging circuit of this embodiment comprises a battery charging source 200, a charge control circuit unit 300, a temperature detection unit 100 including a temperature sensor 110 and a temperature conversion circuit unit 120, a differential circuit unit 400, a voltage comparator unit 500, and a timer circuit unit 600.

The temperature detection unit 100 and the differential circuit unit 400 constitute a temperature change rate detection unit 450.

The battery charging source 200 is connected to a secondary battery 10 (to be referred to as a battery hereinafter), e.g., a nickel-hydrogen battery. As the battery charging source 200, a power supply for obtaining a DC current by rectifying an output from an AC power supply, or another battery having a relatively large capacity is used.

The temperature sensor 110 (arranged in or adjacent to the battery 10) detects the temperature of the battery 10.

The temperature conversion circuit unit 120 converts an output from the temperature sensor 110 into a voltage output value $V_t$ which changes almost linearly, i.e., almost proportional to a change in temperature.

FIG. 2 shows the circuit arrangement of the temperature conversion circuit unit 120. In FIG. 2, a thermistor Th is used as the temperature sensor 110. The thermistor Th has two input terminals. One input terminal a is applied with a reference voltage $V_{ref}$. The other input terminal b is grounded through a resistor R, and is connected to an output terminal c. The resistance of the thermistor Th is nonlinearly decreased as the temperature increases. However, when the resistance of the resistor R is appropriately selected in correspondence with the characteristics of the thermistor Th, a voltage output $V_t$ almost proportional to the detection temperature of the thermistor Th can be obtained from the output terminal c.

The output from the temperature detection unit 100 is input to the differential circuit unit 400, and is differentiated by the differential circuit unit 400.

FIG. 3 shows the circuit arrangement of the differential circuit unit 400. The differential circuit unit 400 comprises an operational amplifier 410 whose inverting input terminal receives a reference voltage (a ground potential in this embodiment), a series circuit of a capacitor $C_1$ and a resistor $R_2$ connected between the operational amplifier and an input terminal a, and a parallel circuit of a capacitor $C_2$ and a resistor $R_3$ connected between the inverting input terminal and the output terminal of the operational amplifier 410. The output terminal of the operational amplifier 410 serves as an output terminal b of the differential circuit unit 400. In the differential circuit unit 400, respective constants are selected, so that the rate of change in temperature (in particular, the rate of increase in temperature) of the battery 10 can be detected. As has been described above with reference to FIG. 2, the resistance of the thermistor Th is nonlinearly decreased as the temperature increases. However, the output voltage $V_t$ from the temperature detection unit 100 changes almost inversely proportional to the temperature. when the output value $V_t$ from the temperature detection unit 100 is differentiated by the differential circuit unit 400, a differential output vo is given by:

$$V_o = -C_1 \cdot R_3 dVt/dt$$

when the temperature increases, Vo also has a positive value. The resistor $R_2$ and the capacitor $C_2$ are used for stably operating the differential circuit unit 400.

The thermistor Th constituting the temperature detection unit 100 and the resistor R in the temperature conversion circuit unit 120 shown in FIG. 2 may be connected by replacing the positions of the thermistor Th and the resistor R in the temperature conversion circuit unit 120, so that a voltage almost inversely proportional to a battery temperature detected by the thermistor Th is generated, as shown in FIG. 4. In the circuit shown in FIG. 4, the voltage comparator unit 500 may compare an output $V_t'$ from the differential circuit unit 400 with a setting value $V_k$, and may output an inverted output when $V_t' < V_k$ is established.

The output from the differential circuit unit 400 is input to one input terminal of the voltage comparator unit 500 having two input terminals. The other input terminal of the voltage comparator unit 500 receives the setting value $V_k$. When a differential value as the output from the differential circuit unit 400 exceeds the setting value $V_k$, the voltage comparator unit 500 generates an inverted output indicating that the rate of increase in temperature of the battery 10 has reached a rate of increase in temperature corresponding to the setting value $V_k$.

The timer circuit unit 600 is started simultaneously with the start of charging, and generates a timer output after an elapse of a predetermined period of time (timer time). The output terminal of the timer circuit unit 600 is connected to a control terminal of the charge control circuit unit 300 together with the output terminal of the voltage comparator unit 500.

The charge control circuit unit 300 comprises, e.g., a switching circuit or a parallel circuit of a switching circuit and a resistor. In a normal charging state, the switching circuit is set in an ON state. The switching circuit is set in an OFF state, i.e., a charge control state when a predetermined signal is supplied to the control terminal. In the charge control state, control for completely stopping the charging operation of the battery 10 or decreasing the charging current is performed.

The operation of the charging circuit shown in FIG. 1 will be described below with reference to the charging characteristic graphs shown in FIGS. 5A to 5C.

Figure 5A:
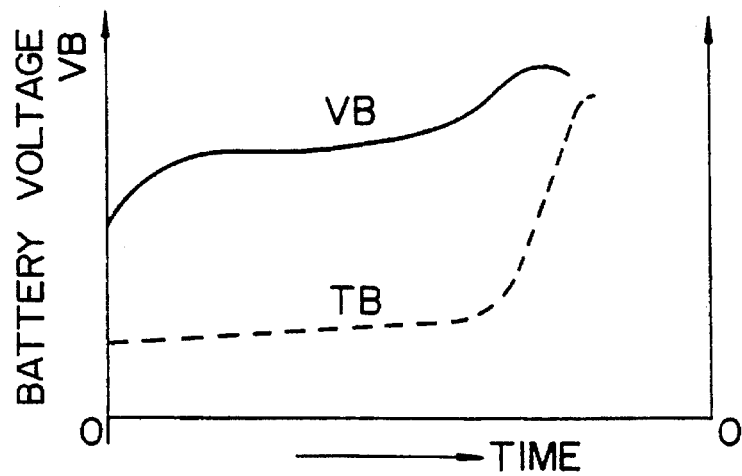
FIGS. 5A to 5C are graphs showing charging characteristics for explaining an operation of the circuit shown in FIG. 1.
Figure 5B:
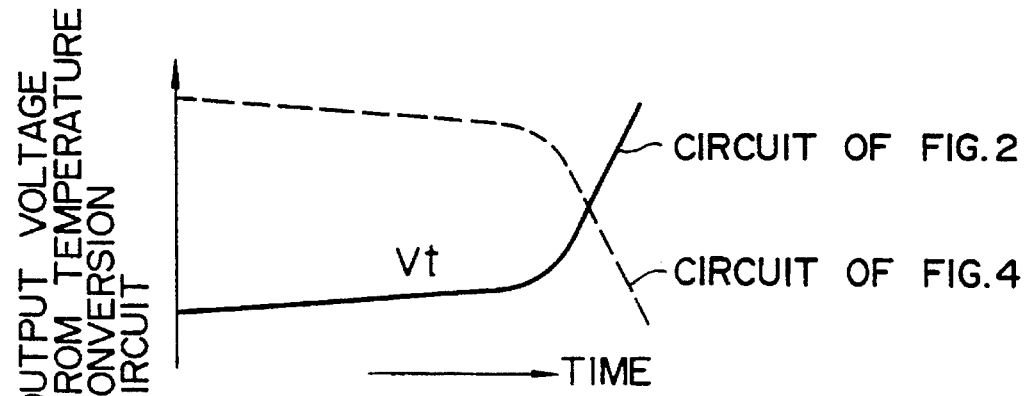
Figure 5C:
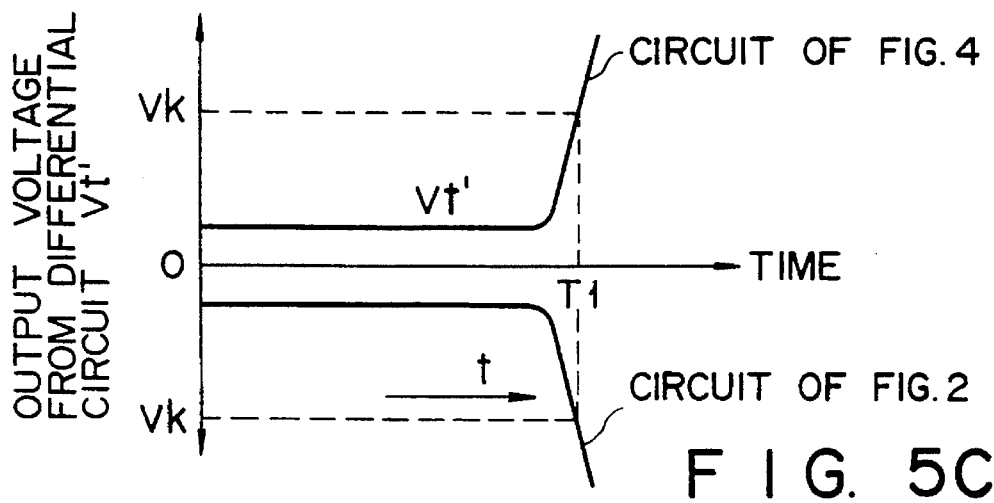

FIG. 5A shows changes in terminal voltage (battery voltage) $v_B$ and temperature (battery temperature) TB over time after charging is started, FIG. 5B shows a change in output $V_t$ from the temperature conversion circuit unit 120 over time after charging is started, and FIG. 5C shows a change in output (differential value) $V_t'$ from the differential circuit unit 400 over time after charging is started.

when a charging operation is started, the battery charging source 200 begins to supply a charging current to the battery 10 via the charge control circuit unit 300. When the current is supplied to the battery 10, the battery voltage $V_B$ is increased accordingly. The battery temperature $T_B$ is almost constant or linearly increased by a small amount.

As the charging operation progresses and reaches the final period of charging, the temperature of the battery 10 begins to abruptly increase. The temperature of the battery 10 is converted into an electrical signal by the temperature sensor 110, and the electrical signal is converted into a voltage output $V_t$ drawn by real line almost proportional to the temperature by the temperature conversion circuit unit 120 shown in FIG. 2. The temperature conversion circuit 120 shown in FIG. 4 converts a temperature to a voltage output $V_t'$ drawn by dot line. The output $V_t$ from the temperature conversion circuit unit 120 is input to the differential circuit unit 400, and a voltage differential value corresponding to a rate of increase in temperature of the battery 10 with respect to time is output as an output $V_t'$ from the differential circuit unit 400. The output $V_t'$ from the differential circuit unit 400 is a zero or small positive voltage in the initial or middle period of charging, and is abruptly increased in the final period of charging.

By using the temperature conversion circuit unit 120 shown in FIG. 4, the temperature conversion circuit unit 120 output $V_t'$ indicated by dot line, and the voltage comparator unit 500 compares the output $V_t'$ from the differential circuit unit 400 with the setting value $V_k$, and generates an inverted output when $V_t' > V_k$ is established. By using the temperature conversion circuit unit 120 shown in FIG. 2, the voltage comparator unit 500 compares the output $V_t'$ from the differential circuit unit 400 with the setting value $V_k$, and generates an inverted output when $V_t'<V_k$ is established. The inverted output is input to the charge control circuit unit 300, thereby setting the charge control circuit unit 300 in the charge control state. when the charge control circuit unit 300 is set in the charge control state, since the switching circuit is set in an OFF state, control for stopping the charging operation, or control for decreasing the charging current upon insertion of a resistor in a charging path is executed by the charge control circuit unit 300.

A normal charging operation is performed, as described above.

If an abnormality occurs in the temperature sensor 110, the temperature conversion circuit unit 120, the differential circuit unit 400, the voltage comparator unit 500, and the like, or if a connection error among these units occurs, and the rate of increase in temperature of the battery 10 reaches a value for causing the output $V_t'$ from the differential circuit unit 400 to reach the setting value $v_k$, the inverted output from the voltage comparator unit 500 cannot be normally supplied to the charge control circuit unit 300. In this case, the timer circuit unit 600 outputs a timer output after an elapse of the predetermined period of time, and the timer output is input to the charge control circuit unit 300. In response to the timer output, the charge control circuit unit 300 is set in the charge control state, thus performing control for stopping the charging operation or control for decreasing the charging current, as described above.

Since the timer circuit unit 600 is arranged in this manner, even if an abnormality occurs in a circuit, e.g., the temperature sensor 110, the temperature conversion circuit unit 120, the differential circuit unit 400, the voltage comparator unit 500, and the like, or if a connection error occurs among these units, the charge control circuit unit 300 can be set in the charge control state in response to the timer output from the timer circuit unit 600. Therefore, according to the first aspect of the present invention, the temperature of the battery 10 can be prevented from being abnormally increased due to overcharging.

Figure 6:
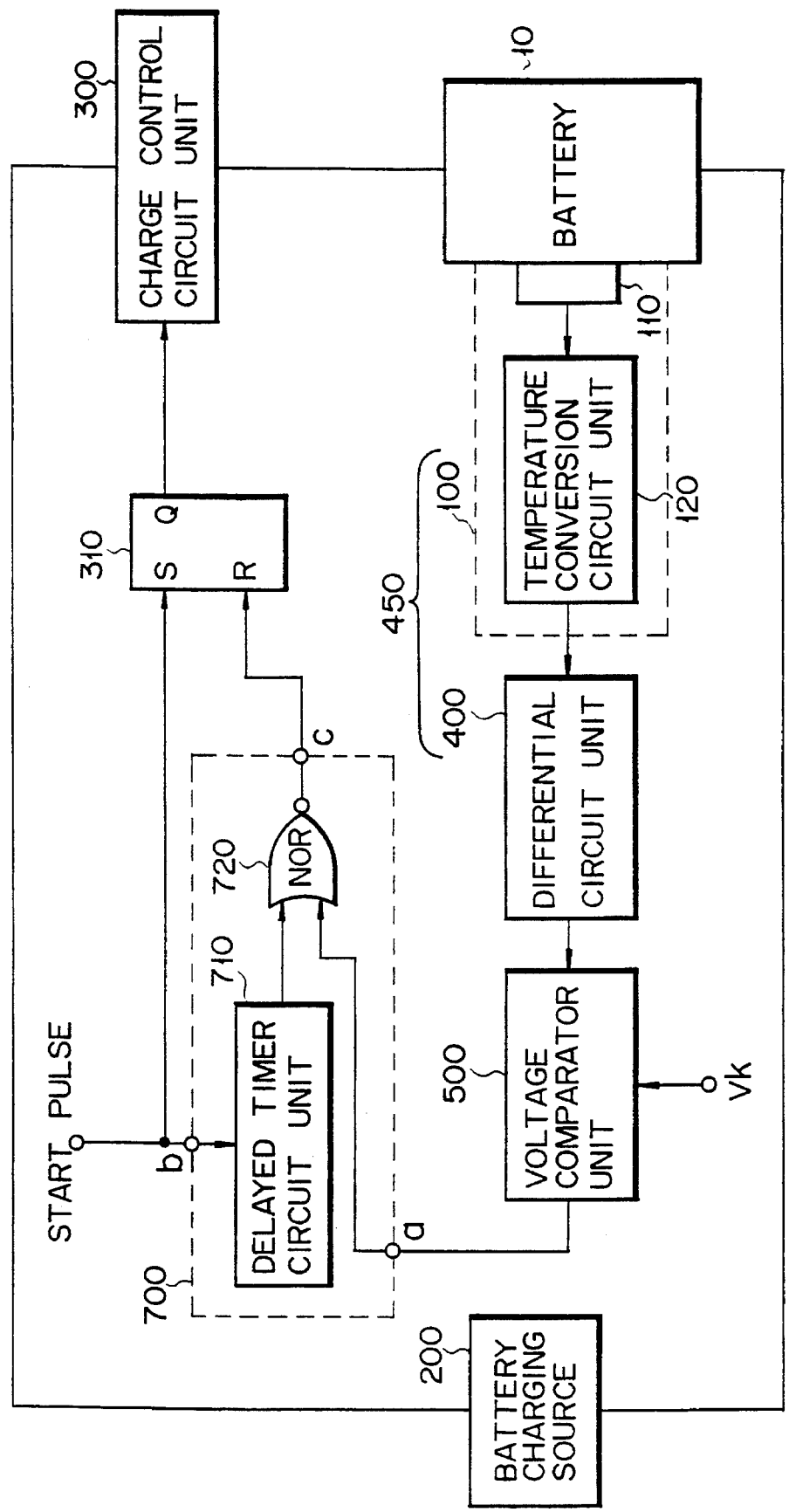
FIG. 6 is a block diagram showing an arrangement of a secondary battery charging circuit according to the second embodiment of the present invention.

FIG. 6 is a block diagram showing an arrangement of a charging circuit according to the second embodiment of the present invention.

In this embodiment, a difference from the first embodiment is that an initial setting circuit unit 700 and a flip-flop circuit unit 310 are arranged. The same reference numerals as in the first embodiment denote the same units in the second embodiment, and a detailed description thereof will be omitted (the same applies to the following third to seventh embodiments). In the second to seventh embodiments, the timer circuit unit 600 is omitted. However, the timer circuit unit 600 can be employed to improve safety like in the first embodiment.

The temperature of a battery 10 is detected by a temperature change rate detection unit 450, and is subjected to predetermined processing. The detected temperature is then output to a voltage comparator unit 500. Thereafter, predetermined processing is performed in the voltage comparator unit 500 in the same manner as in the first embodiment.

The output from the voltage comparator unit 500 is input to the first input terminal of a NOR gate 720 of the initial setting circuit unit 700 via a terminal a. The initial setting circuit unit 700 is constituted by, e.g., the NOR gate 720 and a delay timer circuit unit 710. The delay timer circuit unit 710 is started in response to a start pulse (charging start signal) input via a terminal b, and the output terminal of the delay timer circuit unit 710 is connected to the second input terminal of the NOR gate 720. An output terminal c of the NOR gate 720 corresponding to the output terminal of the initial setting circuit unit 700 is connected to a reset input terminal R of the flip-flop circuit unit 310, and a set input terminal of the flip-flop circuit unit 310 receives the start pulse. An output terminal Q of the flip-flop circuit unit 310 is connected to a control terminal of a charge control circuit unit 300.

The operation of the charging circuit shown in FIG. 6 will be described below with reference to the charging characteristic graphs shown in FIGS. 7A and 7B.

FIG. 7A shows a change in differential output Vo from a differential circuit unit 400 over time after charging is started, and FIG. 7B shows a change in output from the delay timer circuit unit 710 over time after charging is started. Changes in terminal voltage $V_B$ and temperature $T_B$ of the battery 10 over time after charging is started are as shown in FIG. 5A.

When a start pulse generated in response to a power-on or switch-on operation of the charging circuit is applied to the set input terminal S of the flip-flop circuit unit 310, the output terminal Q of the flip-flop circuit unit 310 goes to high level, and the charge control circuit unit 300 is set in a fast charging state. when the fast charging state is set, a large current is supplied from a battery charging source 200 to the battery 10, thus starting fast charging.

The start pulse is also supplied to the terminal b of the initial setting circuit unit 700 to start the delay timer circuit unit 710. The output from the delay timer circuit unit 710 goes to high level for only a predetermined period of time t a after the unit 710 is started, and then goes to low level after an elapse of the predetermined period of time. The output is output to the second input terminal of the NOR gate 720.

The output Vo from the differential circuit unit 400 often exceeds the setting value $V_k$ due to self-heating of the temperature sensor 110 or an abrupt change in charging current of the capacitor in the differential circuit unit 400 in the initial period of charging, i.e., during a period between start time t=0 until time $t_b$, as shown in FIG. 7A. In a case shown in FIG. 7A, the voltage comparator unit 500 generates an inverted output during period between t=0 until time $t_b$.

When the timer time t a of the delay timer circuit unit 710 is set to satisfy $t_a>t_b$, as shown in FIG. 7B, the second input terminal of the NOR gate 720 is kept at high level during the timer time $t_a$. For this reason, even when the voltage comparator unit 500 outputs a low-level inverted output during a period between t=0 and time $t_b$, and the inverted output is applied to the first input terminal of the NOR gate 720, the output from the NOR gate 720 is kept at low level. Therefore, the output terminal Q of the flip-flop circuit unit 310 is kept at high level, and the charge control circuit unit 300 can maintain the fast charging state.

when the charging operation progresses and reaches the final period of charging after time $t=t_a$, the temperature $T_B$ of the battery 10 begins to immediately increase, and the output Vo from the temperature change rate detection unit 450 corresponding to the rate of change of the temperature rise is increased, as shown in FIG. 7A. when the output Vo from the differential circuit unit 400 exceeds the setting value $V_k$ when $t=t_c$, the voltage comparator unit 500 generates a low-level inverted output. At this time, the timer time $t_a$ has already elapsed in the delay timer circuit unit 710, and the output from the unit 710 is set at low level. Thus, both the input terminals of the NOR gate 720 go to low level, and the output from the NOR gate 720 goes to high level. Therefore, when the reset terminal R of the flip-flop circuit unit 310 goes to high level, the output terminal Q of the flip-flop circuit unit 310 goes to low level, as a result, the charge control circuit unit 300 is set in the charge control state.

Modifications of the initial setting circuit unit 700 will be described hereinafter with reference to FIGS. 8 to 10.

FIG. 8 shows the first modification of the initial setting circuit unit 700.

The initial setting circuit unit 700 of the first modification includes the flip-flop circuit unit 310 shown in FIG. 6. The flip-flop circuit unit 310 comprises NOR gates 311A and 311B, and a NOT gate 312. The set input terminal S is connected to one input terminal of the NOR gate 311A, and the reset input terminal R is connected to one input terminal of the NOR gate 311B. The other input terminal of the NOR gate 311A is connected to the output terminal of the NOR gate 311B, and the other input terminal of the NOR gate 311B is connected to the output terminal of the NOR gate 311A. The output terminal of the NOR gate 311A is connected to the input terminal of the NOT gate 312, and the output terminal of the NOT gate 312 serves as the output terminal c of the initial setting circuit unit 700. The set input terminal S of the flip-flop circuit unit 310 is connected to the output terminal of the delay timer circuit unit 710, and the delay timer circuit unit 710 and the flip-flop circuit unit 310 constitute the initial setting circuit unit 700.

According to the arrangement shown in FIG. 8, when both the set and reset input terminals S and R of the flip-flop circuit unit 310 simultaneously go to high level, the status of the set input terminal S is preferentially used, and the output terminal Q goes to high level. When a start pulse is input to the input terminal b of the initial setting circuit unit 700, the delay timer circuit unit 710 is started, and the output terminal of the delay timer circuit unit 710 is kept at high level for a predetermined period of time $t_a$. This high-level output is input to the set input terminal S of the flip-flop circuit unit 310. Thus, the output terminal Q of the flip-flop circuit unit 310 goes to high level, and the charge control circuit unit 300 is set in the fast charging state.

Assume that the output Vo from the differential circuit unit 400 exceeds the setting value $V_k$ due to self-heating of the temperature sensor 110 or an abrupt change in charging current of the capacitor in the differential circuit unit 400 before time $t_a$ from the beginning of charging, and the voltage comparator unit 500 generates a high-level inverted output (in this case, the input terminals of the voltage comparator unit 500 are assumed to be connected to sides opposite to those shown in FIG. 6, i.e., the non-inverting input terminal is connected to the output terminal of the differential circuit unit 400, and the inverting input terminal is applied with the setting value $V_k$). Thus, even when one input terminal of the NOR gate 311B goes to high level, since the output terminal of the delay timer circuit unit 710 is at high level, the output terminal Q of the flip-flop circuit unit 310 is kept at high level, and the charge control circuit unit 300 maintains the fast charging state.

FIG. 9 shows the second modification of the initial setting circuit unit 700.

The initial setting circuit unit 700 shown in FIG. 9 comprises the delay timer circuit unit 710, and two switch elements 711A and 711B. The switch elements 711A and 711B are respectively connected in parallel with the resistors $R_2$ and $R_3$ of the differential circuit unit 400. The switch elements 711A and 711B can comprise, e.g., semiconductor switches such as bipolar transistors, field effect transistors, and the like, or mechanical switches such as lead switches.

When the delay timer circuit unit 710 is started in response to a start pulse generated at the beginning of charging, the switch elements 711A and 711B are set in an ON state. When the switch elements 711A and 711B are set in an ON state, the resistors $R_2$ and $R_3$ constituting a time constant element together with the capacitors $C_1$ and $C_2$ in the differential circuit unit 400 are short-circuited, thereby setting a small time constant. In this manner, after the charging circuit is powered, the output from the operational amplifier 410 in the differential circuit unit 400 (i.e., the output from the differential circuit unit 400) can be immediately stabilized. Thus, even when the output value $V_t$ from the temperature conversion circuit unit 120 is changed due to self-heating of the temperature sensor 110, the output from the operational amplifier 410 is almost zero, and no inverted output is generated.

FIG. 10 shows the third modification of the initial setting circuit unit 700.

The initial setting circuit unit 700 shown in FIG. 10 comprises the delay timer circuit unit 710 and a switch element 711. The switch element 711 is connected between a node between the capacitor $C_1$ and the resistor $R_2$, and the non-inverting input terminal of the operational amplifier 410 of the differential circuit unit 400, and is set in an ON state for only a predetermined period of time t a at the beginning of charging in accordance with the output from the delay timer circuit unit 710. In FIG. 10, since one terminal of the capacitor $C_1$ on the side of the resistor $R_2$ is grounded through the switch element 711 at the beginning of charging, a small time constant is set like in the circuit shown in FIG. 9, and the same effect as in the circuit shown in FIG. 9 can be obtained.

FIG. 11 shows a secondary battery charging circuit according to the third embodiment of the present invention.

A difference between this embodiment and the first embodiment is that a second timer circuit unit 715, a signal identification circuit unit 800, and a flip-flop circuit unit 310 are arranged between a voltage comparator unit 500 and a charge control circuit unit 300.

In FIG. 11, a battery temperature is detected, and the detection output subjected to predetermined processing in a temperature change rate detection unit 450 is compared with a predetermined voltage, thereby outputting an inverted output from the voltage comparator unit 500 like in the first embodiment.

Figure 12:
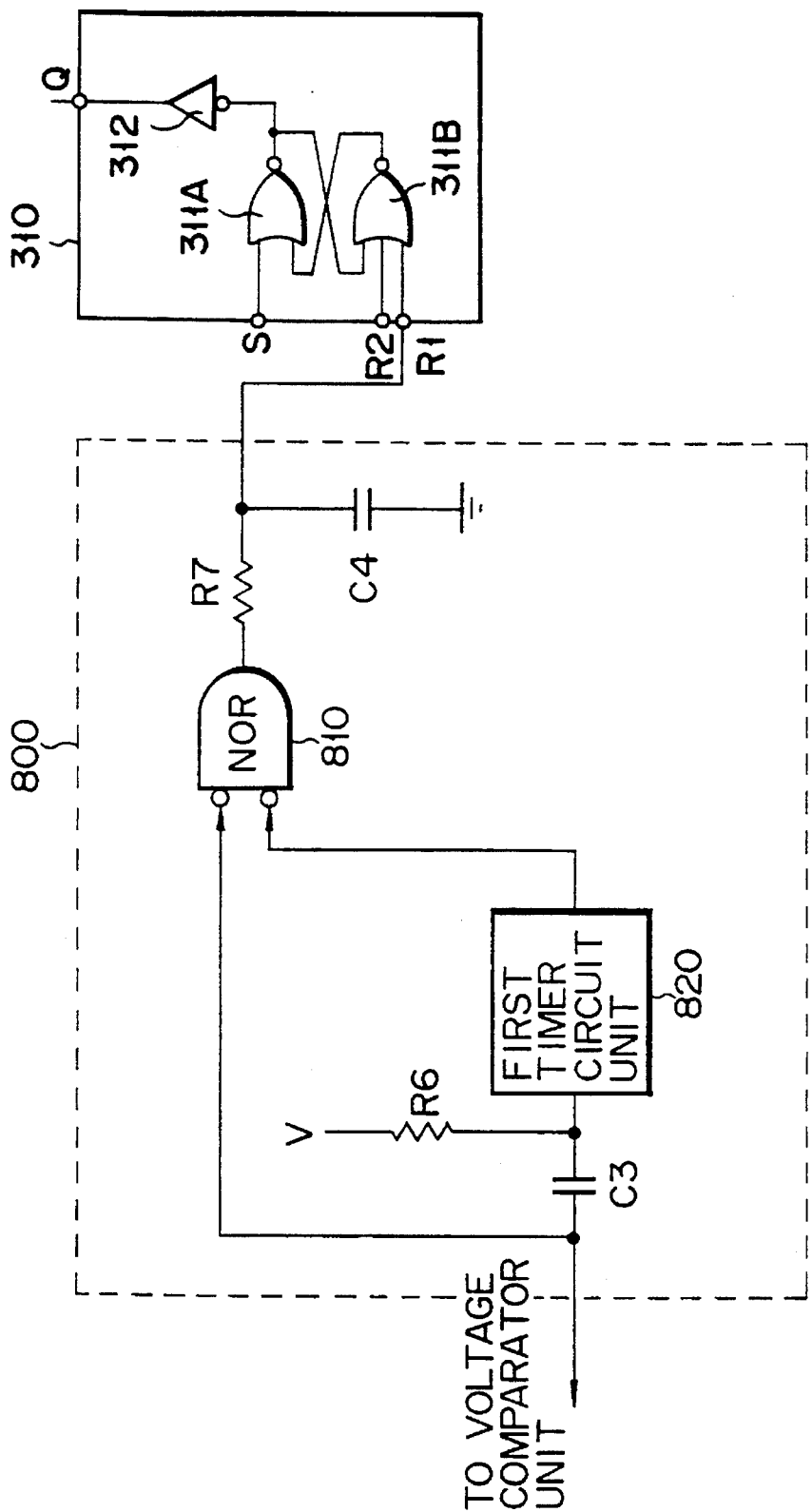
FIG. 12 is a circuit diagram showing a detailed arrangement of a control circuit unit shown in FIG. 11.

The output from the voltage comparator unit 500 is connected to the signal identification circuit unit 800. FIG. 12 shows a circuit arrangement of the signal identification circuit unit 800. In FIG. 12, the output from the voltage comparator unit 500 is connected to the input terminal of the signal identification circuit unit 800. The input terminal of the signal identification circuit unit 800 is connected to the first input terminal of a NOR gate 810, and is also input to a first timer circuit unit 820 via a time constant circuit constituted by a resistor $R_6$ and a capacitor $C_3$. The second input terminal of the NOR gate 810 is connected to the output terminal of the first timer circuit unit 820. The output terminal of the NOR gate 810 is connected to an integration circuit constituted by a resistor R7 and a capacitor C4, and the output from the integration circuit is connected to a first reset terminal R1 of the flip-flop circuit unit 310 via the output terminal of the signal identification circuit unit 800. The integration circuit constituted by the resistor R7 and the capacitor C4 is used for absorbing a hazard component generated due to a shift between timings of signals applied to the two input terminals of the NOR gate 810.

The flip-flop circuit unit 310 has three input terminals, i.e., a set terminal S and reset terminals R1 and R2, and one output terminal Q, and is constituted by a NOR gate 311A having two input terminals, a NOR gate 311B having three input terminals, and a NOT gate 312. In the flip-flop circuit unit 310 of this embodiment, the number of input terminals of the NOR gate 311B of the flip-flop circuit unit 310 shown in FIG. 8 is increased to three, and the operation is the same as that of the flip-flop circuit unit 310 shown in FIG. 8.

The reset terminal R2 of the flip-flop circuit unit 310 is connected to the output terminal of the second timer circuit unit 715 which is started in response to a start pulse. The start pulse is also applied to the set input terminal S of the flip-flop circuit unit 310. The second timer circuit unit 715 outputs a timer output for forcibly executing charge control when control by the temperature change rate detection unit 450, the voltage comparator unit 500, and the signal identification circuit unit 800 cannot be normally operated. The output terminal Q of the flip-flop circuit unit 310 is connected to a control terminal of the charge control circuit unit 300.

The charge control circuit unit 300 is set in a fast charging state when the output terminal Q of the flip-flop circuit unit 310 is at high level, and is set in a charge control state when the terminal Q is at low level. In the charge control state, the charge control circuit unit 300 completely stops charging of a battery 10 or decreases the charging current.

The operation of the charging circuit shown in FIG. 11 will be described below with reference to charging characteristic graphs shown in FIGS. 13A to 13D.

Changes in terminal voltage $V_B$ and temperature $T_B$ of the battery 10 over time after charging is started are as shown in FIG. 5A.

In FIG. 11, when a start pulse generated in response to a power-on or switch-on operation of the charging circuit is applied to the set terminal S of the flip-flop circuit unit 310, the output terminal Q of the flip-flop circuit unit 310 goes to high level, and the charge control circuit unit 300 is set in a fast charging state. In this case, a battery charging source 200 supplies a large current to the battery 10, thus starting fast charging.

Figure 13A:
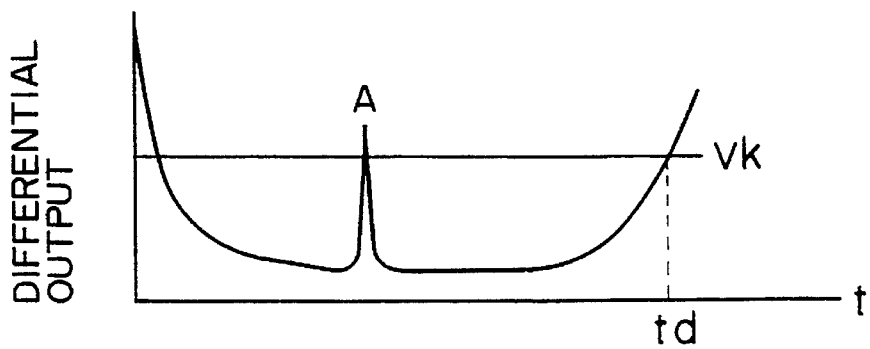
FIG. 13A is a graph showing charging characteristics of a differential output.
Figure 13B:
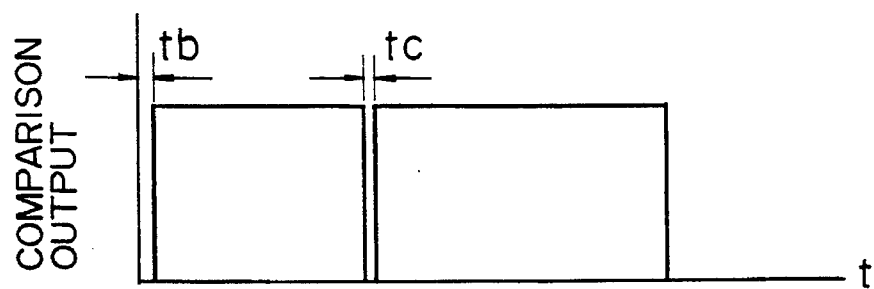
FIG. 13B is a graph showing charging characteristics of a comparison output.
Figure 13C:
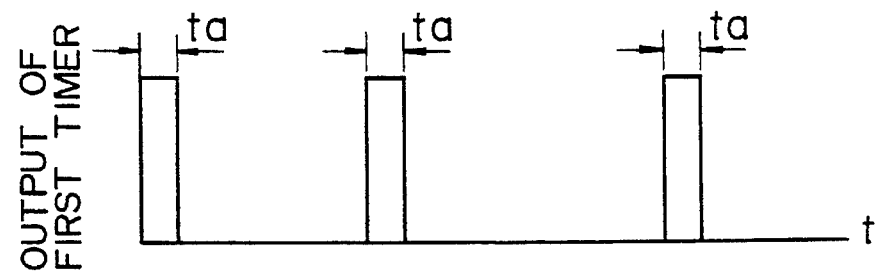
FIG. 13C is a graph showing charging characteristics of a first timer output.
Figure 13D:
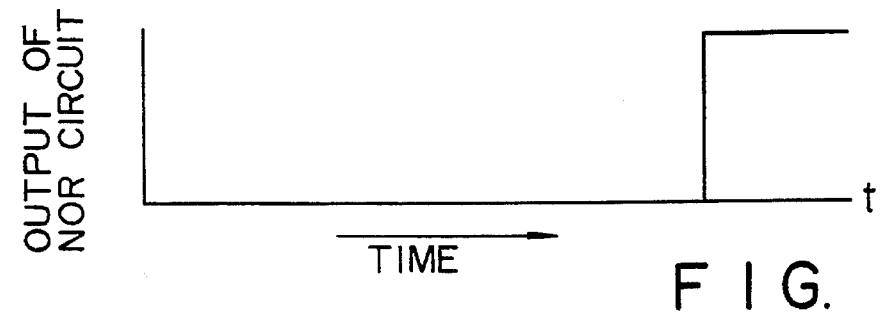
FIG. 13D is a graph showing charging characteristics of a NOR gate output.

An output Vo from a differential circuit unit 400 may often exceed the setting value $V_k$ due to self-heating of a temperature sensor 110, charging of a capacitor in the differential circuit unit, an abrupt change in charging current, or the like in the initial period of charging, i.e., in a period between start time t=0 and time $t_a$, as indicated by a solid curve in FIG. 13A, and the voltage comparator unit 500 may generate a comparison output. During charging, an output from the temperature sensor 110 may often be changed due to electrical noise, a small thermal resistance between the temperature sensor 110 and the battery 10, or a change in ambient temperature or air current, and a peak A may appear in a differential output, as shown in FIG. 13A. In this case, a comparison output may be generated during a period between $t_b$ and $t_c$, as shown in FIG. 13B. However, as shown in FIG. 13C, the output from the first timer circuit unit 820 goes to high level during $t_a$ after the comparison output is generated, and if $t_b<t_a$ and $t_c<t_a$ are satisfied, the output from the NOR gate 810 is kept at low level. Thus, the charge control circuit unit 300 maintains a fast charging state.

When the charging operation progresses and reaches the final period of charging, and when the battery temperature is abruptly increase, as shown in FIG. 5A, a differential output is also increased, as shown in FIG. 13A. When the differential output exceeds a setting value $V_k$ at time $t=t_d$ upon an increase in differential output, the comparison output is generated, and the output from the first timer circuit unit 820 goes to high level during a period between $t=t_d$ and $t_a$. After an elapse of the timer time of the first timer circuit unit 820, when $t>t_d+t_a$ is satisfied, both the signals input to the two input terminals of the NOR gate 810 go to low level. Thus, the output from the NOR gate 810 goes to high level, and the output Q from the flip-flop circuit unit 310 goes to low level. As a result, the charge control circuit unit is set in the charge control state.

The second timer circuit unit 715 is started simultaneously with the beginning of fast charging. If a temperature change rate detection circuit, or the like cannot be normally operated, and if the reset terminal R1 of the flip-flop circuit unit 310 does not go to high level after time $t=t_d+t_a$, and fast charging continues, the reset terminal R2 of the flip-flop circuit unit 310 goes to high level in response to the timer output from the second timer circuit unit 715. Thus, the output Q from the flip-flop circuit unit 310 goes to low level, and the charge control circuit unit 300 is set in the charge control state. As a result, the battery can be prevented from being considerably overcharged.

FIG. 14 shows a modification of the signal identification circuit unit 800. The input terminal c of the signal identification circuit unit 800 is connected to the input terminal of a NOT gate 830, and is also connected to the first timer circuit unit 820 via a time constant circuit constituted by the resistor $R_6$ and the capacitor $C_3$. The output terminal of the NOT gate 830 is connected to an output terminal e of the signal identification circuit unit 800, and the output terminal of the first timer circuit unit 820 is connected to an output terminal f of the signal identification circuit unit 800.

In the flip-flop circuit unit 310 of this modification, the flip-flop circuit unit 310 shown in FIG. 8 is modified to have two set input terminals and two reset input terminals. That is, the flip-flop circuit unit 310 has two set terminals S1 and S2, two reset terminals R1 and R2, and an output terminal Q, and is constituted by NOR gates 311A and 311B, and a NOT gate 312. A reset signal R1 is connected to the first input terminal of the NOR gate 311B, and a reset signal R2 is connected to the second input terminal of the NOR gate 311B. The third input terminal of the NOR gate 311B is connected to the output terminal of the NOR gate 311A and the input terminal of the NOT gate 312. The first input terminal of the NOR gate 311A is connected to the input terminal of the NOR gate 311B, the second input terminal thereof is connected to the set terminal S1 of the flip-flop circuit unit 310, and the third input terminal thereof is connected to the set terminal S2 of the flip-flop circuit unit 310. The output terminal of the NOT gate 312 is connected to the output terminal Q of the flip-flop circuit unit 310. when the set terminal S1 or S2 and the reset terminal R1 or R2 of the flip-flop circuit unit 310 simultaneously go to high level, the set signal is preferentially received, and the output terminal Q goes to high level.

The set terminal S1 of the flip-flop circuit unit 310 is connected to the output terminal f of the signal identification circuit unit 800, and the reset terminal R1 thereof is connected to the output terminal e of the signal identification circuit unit 800. The reset terminal R2 is connected to the output terminal of the second timer circuit unit 715 which is started in response to a start pulse. The start pulse is also applied to the set terminal S2 of the flip-flop circuit unit 310. The second timer circuit unit 715 is used for forcibly executing charge control in response to its timer output when control by the temperature change rate detection unit, the comparator unit, and the signal identification circuit unit cannot be normally operated. The output terminal Q of the flip-flop circuit unit 310 is connected to the charge control circuit unit 300.

In FIG. 14, when a comparison output is generated from the voltage comparator unit 500, and is applied to the input terminal c of the signal identification circuit unit 800, a high-level signal from the NOT gate 830 is applied to the reset terminal R1 of the flip-flop circuit unit 310 via the output terminal e of the signal identification circuit unit 800. However, the first timer circuit unit 820 is started via the time constant circuit constituted by the resistor $R_6$ and the capacitor $C_3$ simultaneously with generation of the comparison output, and its output is set at high level for only a time $t_a$. Therefore, when the comparison output disappears before an elapse of the time $t_a$ from generation of the comparison output from the voltage comparator unit 500, since a high-level signal is applied to the set terminal S1 of the flip-flop circuit unit 310 via the output terminal f of the signal identification circuit unit 800, the output terminal Q of the flip-flop 310 is kept at high level, and the charge control circuit unit maintains the fast charging state. If the comparison output is kept generated after an elapse of the time $t_a$ from generation of the comparison output from the voltage comparator unit 500, both the set terminals S1 and S2 of the flip-flop circuit unit 310 go to low level, and the reset terminal R1 goes to high level. Therefore, the output terminal Q of the flip-flop circuit unit 310 goes to low level, and the charge control circuit unit 300 is set in the charge control state.

In FIG. 11, the temperature change rate detection unit comprises the analog differential circuit including the resistor, the capacitor, and the operational amplifier. However, the output from the temperature detection unit may be measured at every predetermined time $t_c$, a difference A of a measurement value from a previous measurement value is calculated, and when the difference Δ exceeds a setting value, charging may be controlled.

Figure 15:
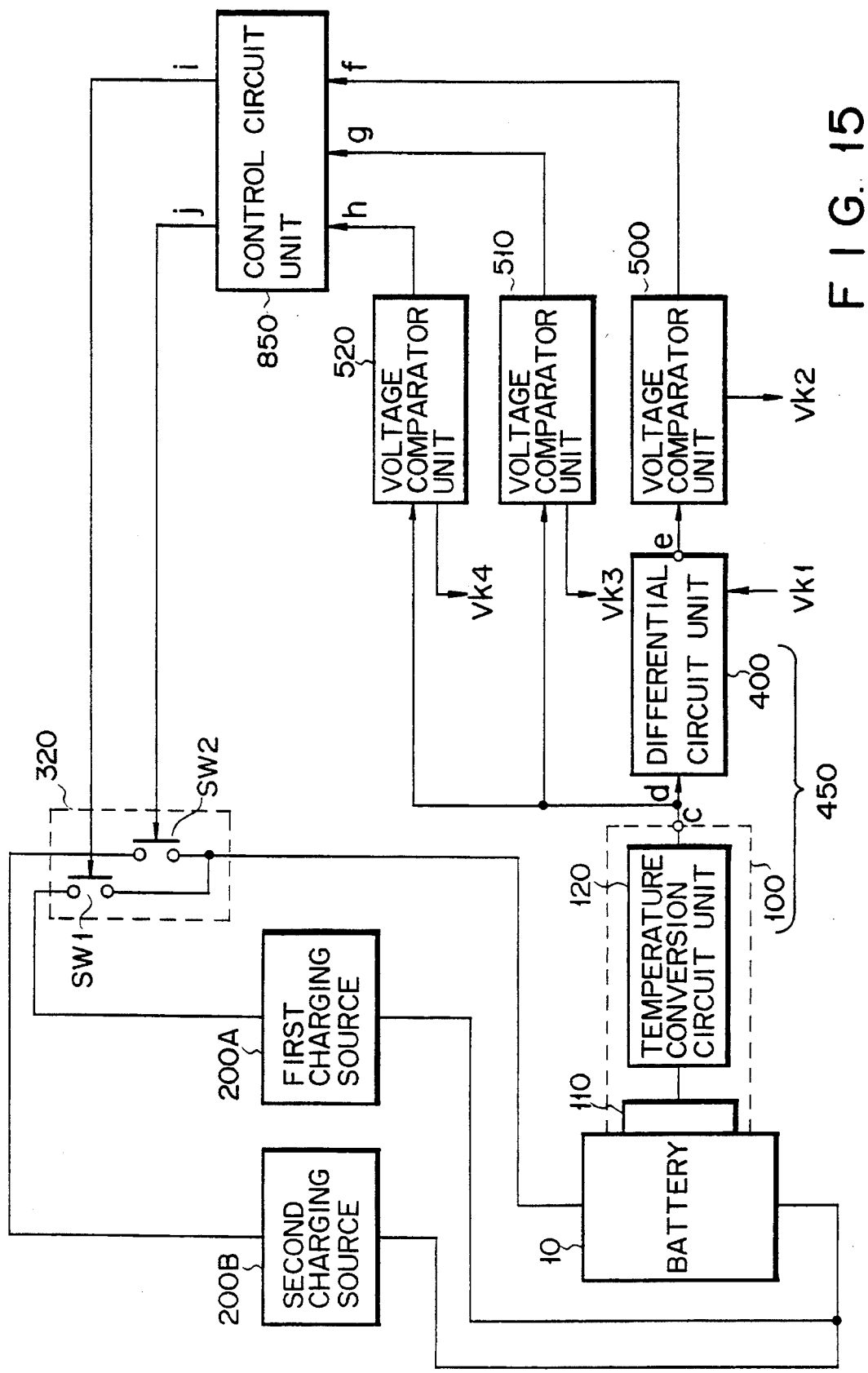
FIG. 15 is a block diagram showing an arrangement of a secondary battery charging circuit according to the fourth embodiment of the present invention.

FIG. 15 is a block diagram of a charging circuit according to the fourth embodiment of the present invention.

Differences between this embodiment and the first embodiment are that two battery charging sources are arranged, voltage comparator units 510 and 520, and a control circuit unit 850 are arranged between a voltage comparator unit 500 and a charge control circuit unit 300, and a switching circuit 320 is arranged in place of the charge control circuit.

First and second charging sources 200A and 200B are selectively connected via the switching circuit 320 consisting of two switches SW1 and SW2. The switches SW1 and SW2 can comprise, e.g., transistors, thyristors, relays, or the like. The first charging source 200A is used for fast charging, and the second charging source 200B is used for quick charging. Each of these charging sources obtains a DC output by rectifying an output from an AC power supply, or comprises another battery having a relatively large capacity. Note that the output current of the second charging source 200B is lower than that of the first charging source 200A.

An output terminal c of a temperature detection unit 100 is connected to an input terminal d of a temperature change rate detection unit 450. An output terminal e of the temperature change rate detection unit 450 is connected to the non-inverting input terminal of the voltage comparator unit 500.

The output terminal c of the temperature detection unit 100 is also connected to the inverting input terminal of the voltage comparator unit 510. The non-inverting input terminal of the voltage comparator unit 510 is applied with a reference voltage $V_{k3}$, and the voltage comparator unit 510, a generator (not shown) for generating the reference voltage $V_{k3}$, and the temperature detection unit 100 constitute a first temperature detection unit. In the first temperature detection unit, when a temperature detected by a thermistor Th is increased, and an output $V_t$ from a temperature conversion circuit unit 120 is decreased and reaches $V_{k3}$, the output from the voltage comparator unit 510 is inverted from low level to high level, thereby generating a detection output indicating that the temperature of a battery 10 has reached a first setting temperature corresponding to the setting value $V_{k3}$.

The output terminal c of the temperature detection unit 100 is further connected to the inverting input terminal of the voltage comparator unit 520. The non-inverting input terminal of the voltage comparator unit 520 is applied with a reference voltage $V_{k4}$ lower than the reference voltage $V_{k3}$ applied to the voltage comparator unit 510. The voltage comparator unit 520, a generator (not shown) for generating the reference voltage $V_{k4}$, and the temperature detection unit 100 constitute a second temperature detection unit. In the second temperature detection unit, when the temperature detected by the thermistor Th is increased, and the output $V_t$ from the temperature conversion circuit unit 120 is decreased and reaches $V_{k4}$, the output from the voltage comparator unit 520 is inverted from low level to high level, thereby generating a detection output indicating that the temperature of the battery 10 has reached a second setting temperature corresponding to the setting value $V_{k4}$.

The output terminals of the voltage comparator units 500, 510, and 520 are respectively connected to input terminals f, g, and h of the control circuit unit 850. FIG. 16 shows a circuit arrangement of the control circuit unit 850. In FIG. 16, the input terminal f is connected to the first input terminal of a first OR gate 860A and the first input terminal of a second OR gate 860B, the input terminal g is connected to the second input terminal of the OR gate 860A, and the input terminal h is connected to the second input terminal of the OR gate 860B. The output terminal of the OR gate 860A is connected to a reset input terminal R of a first flip-flop 870A.

A start pulse generated in synchronism with a power-on or switch-on operation is applied to the set input terminal S of the flip-flop 870A. When the start pulse is applied to the set input terminal S of the flip-flop 870A, a non-inverted output Q from the flip-flop 870A goes from low level to high level, and an inverted output p goes from high level to low level. The output from the OR gate 860B is connected to a reset input terminal R of a second flip-flop 870B, and a set input terminal S of the second flip-flop 870B receives the inverted output P from the flip-flop 870A via a single pulse generator unit 880. The single pulse generator unit 880 comprises, e.g., a monostable multi-vibrator.

An output from a CR time constant circuit 890 as a circuit for detecting a power-on state is connected to the third input terminal of the OR gate 860A, and the third input terminal of the OR gate 860B.

The non-inverted output Q from the flip-flop 870A is connected to a control terminal of the switch SW1 of the switching circuit 320 via an output terminal i of the control circuit unit 850, and the non-inverted output Q of the flip-flop 870B is connected to a control terminal of the switch SW2 of the switching circuit 320 via an output terminal j of the control circuit unit 850. These outputs are used for switching ON/OFF states of the switches SW1 and SW2.

The OR gates 860A and 860B, the flip-flops 870A and 870B, the single pulse generator unit 880, and the CR time constant circuit 890 constitute the control circuit unit 850 for charge control.

The operation of the charging circuit shown in FIG. 15 will be described below with reference to FIG. 16, FIGS. 17A to 17C and FIGS. 18A to 18C.

When the power switch of the charging circuit is turned on, the CR time constant circuit 890 generates a pulse having a pulse width determined by a time constant of C (capacitor) and R (resistor). The pulse is input to the reset input terminal R of the flip-flop 870A via the OR gate 860A, and is also input to the reset input terminal R of the flip-flop 870B via the OR gate 860B. As a result, the outputs Q of the flip-flops 870A and 870B go to low level. In this case, both the switches SW1 and SW2 of the switching circuit 320 are set in an OFF state, and no charging current is supplied from the first or second charging source 200A or 200B to the battery 10.

when the start pulse generated in synchronism with a power-on or switch-on operation is input to the set input terminal S of the flip-flop 870A, the output Q from the flip-flop 870A goes to high level. Thus, the switch SW1 of the switching circuit 320 is set in an ON state, and a first charging period is started. During the first charging period, the battery 10 is subjected to fast charging with a current $I_1$ from the charging source 200A.

Figure 17A:
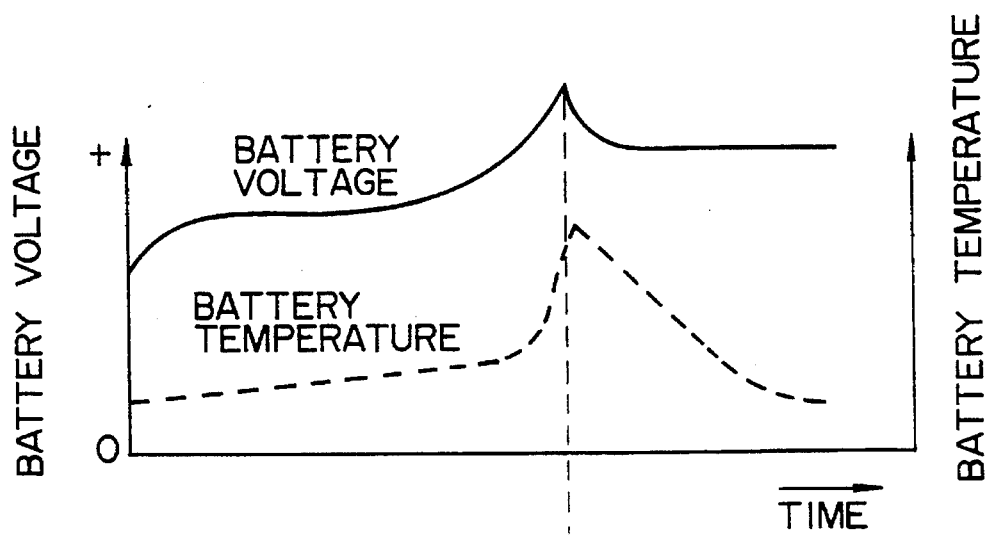
FIGS. 17A to 17C are waveform charts for explaining operations at low temperature and at normal temperature in the fourth embodiment.
Figure 17B:
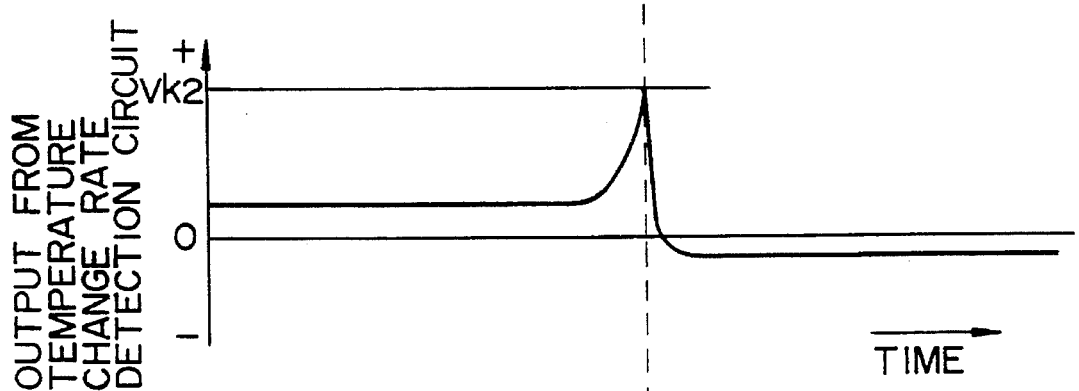
Figure 17C:
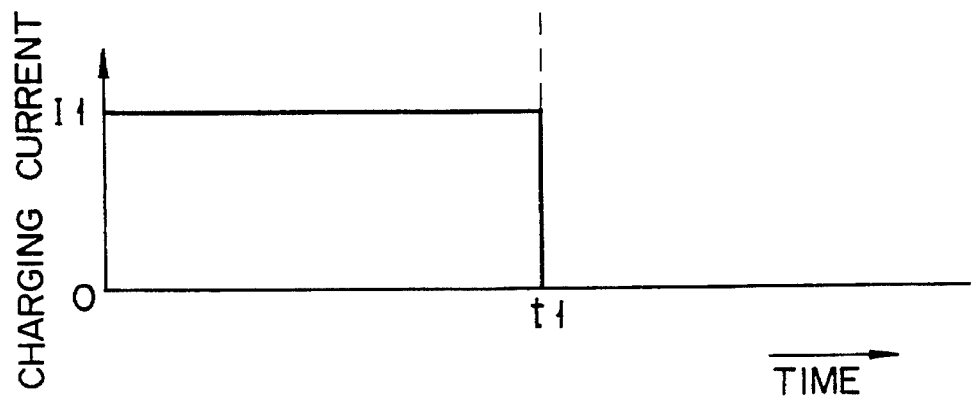

As shown in FIG. 17A, although the temperature of the battery 10 is slowly increased in the initial or middle period of charging, it begins to abruptly increase in the final period of charging. An output of a voltage value corresponding to a rate of change in temperature of the battery 10 with respect to the charging time is obtained by the temperature change rate detection unit 450, and the output from the temperature change rate detection unit 450 is input to the voltage comparator unit 500. The voltage comparator unit 500 compares the output from the temperature change rate detection unit 450 with a setting value, and generates an inverted output at time $t_1$ in FIG. 17B. The inverted output is input to the reset input terminal R of the flip-flop 870A via the OR gate 860A, and is also input to the reset input terminal R of the flip-flop 870B via the OR gate 860B. For this reason, the non-inverted outputs Q of the flip-flops 870A and 870B go to low level, and the switches SW1 and SW2 of the switching circuit 320 are set in an OFF state. Therefore, no charging current is supplied from the first or second charging source 200A or 200B to the battery 10, thus stopping charging.

when the non-inverted output Q from the flip-flop 870A goes to low level, since its inverted output P goes to high level at the same time, a pulse is generated from the single pulse generator unit 880, and is input to the set input terminal S of the flip-flop 870B. The output pulse width of the single pulse generator unit 880 is normally selected to fall within a range between 1ms and 1s. If the flip-flop 870B is a reset priority type flip-flop, since the inverted output from the voltage comparator unit 500 is applied to the reset input terminal R of the flip-flop 870B via the input terminal f of the control circuit unit 850 and the OR gate 860B, even when the pulse from the single pulse generator unit 880 is input to the set input terminal S of the flip-flop 870B, the non-inverted output Q is kept at low level. For this reason, the switch SW2 of the switching circuit 320 is kept in an OFF state, and charging is kept stopped.

when the inverted output from the voltage comparator unit 500 is stopped while the pulse is applied to the set input terminal S of the flip-flop 870B, i.e., when the output from the voltage comparator unit 500 is inverted from high level to low level, the non-inverted output Q from the flip-flop 870B goes to high level. However, in practice, since there is a time delay of several seconds to several tens of seconds (depending on the type of battery 10, the mounting state, the charging current, and the like) from when charging is stopped until the rate of increase in temperature is decreased below a setting value, the non-inverted output Q from the flip-flop 870B will never go to high level.

If the flip-flop 870B is a set priority type flip-flop, since the non-inverted output Q is kept at high level while the pulse from the single pulse generator unit 880 is applied to the set input terminal S of the flip-flop 870B, the switch SW2 in the switching circuit 320 is set in an ON state, and a second charging period is started. However, since the output pulse width of the single pulse generator unit 880 is normally selected to fall within a range between 1ms and 1s, as described above, and it is a negligible time in comparison with the charging time, no problem is posed even if the second charging period is temporarily started.

As described above, even when the inverted output is generated from the voltage comparator unit 500 during the second charging period, the second charging period is not substantially started by stopping charging within zero time or by ending the second charging period within a very short period of time (almost zero time) as compared to the charging period.

In the above-mentioned operations, charging is performed at low or normal temperature. When charging is performed at high temperature, the following operations are performed. FIGS. 18A to 18C show operation waveforms of the respective units when charging is performed at high temperature.

During the first charging period, since the battery 10 slightly generates heat, when charging is performed at high temperature, the relationship between an output $V_t'$ from the temperature change rate detection unit 450 and a setting value $V_{k2}$ satisfies $V_t'<V_{k2}$, i.e., the voltage comparator unit 500 does not generate an inverted output. when $V_t<V_{k3}$ is satisfied at time $t_1$ shown in FIG. 18A before the end of charging, the voltage comparator unit 510 generates a detection output indicating that the battery temperature has reached a first setting temperature ($T_1$).

Since the detection output is input to the reset input terminal R of the flip-flop 870A via the input terminal g of the control circuit unit 850 and the OR gate 860A, the non-inverted output Q from the flip-flop 870A goes to low level. Thus, the switch SW1 of the switching circuit 320 is set in an OFF state, and the first charging period is ended.

Simultaneously with the end of the first charging period, the single pulse generator unit 880 is driven in response to the inverted output P from the flip-flop 870A, thus generating a pulse. Since the non-inverted output Q from the flip-flop 870B goes to high level in response to this pulse, the switch SW2 of the switching circuit 320 is set in an ON state, thus starting the second charging period.

During the second charging period, the battery 10 is charged by the second charging source 200B via the switch SW2. During the second charging period, since the battery is slowly charged with a current 12 lower than that during the first charging period, the temperature rise of the battery 10 becomes slow. When the charging further progresses, the temperature of the battery 10 begins to slowly increase again.

Upon an increase in temperature, when the output $V_t$ from the temperature conversion circuit unit 120 satisfies $V_t<V_{k4}$, i.e., at time $t_2$ in FIG. 18A, one, which is generated earlier, of a detection output generated from the voltage comparator unit 520 and indicating that the temperature of the battery 10 has reached a second setting temperature ($T_2$), and the inverted output from the voltage comparator unit 500 when the rate of increase in temperature of the battery 10 is increased and the output $V_t'$ from the temperature change rate detection circuit 450 is increased accordingly, is input to the reset input terminal R of the flip-flop 870B via the OR gate 860B. For this reason, the non-inverted output Q from the flip-flop 870B goes to low level, and the switch SW2 of the switching circuit 320 is set in an OFF state. As a result, no charging current is supplied from the first or second charging source 200A or 200B to the battery 10, and the charging operation is stopped.

In the above description of the operations, when the output from the temperature change rate detection unit 450 is increased, and the voltage comparator unit 500 generates an inverted output during the first charging period, the second charging period is stopped within zero or almost zero time. Instead, the second charging period may be started in response to one, generated earlier, of a detection output from the first temperature detection unit (the inverted output from the voltage comparator unit 510) and the inverted output from the voltage comparator unit 500, and may be ended in response to one, generated earlier, of a detection output from the second temperature detection unit (the inverted output from the voltage comparator unit 520) and the inverted output from the voltage comparator unit 500.

For this purpose, the flip-flop 870B shown in FIG. 15 may comprise a set priority type flip-flop, and the output pulse width of the single pulse generator unit 880 may be prolonged. when the first charging period transits to the second charging period, the charging current is decreased, and the amount of heat generated by the battery 10 is decreased. Therefore, the temperature of the battery 10 is decreased. However, since there is a time delay until the decrease in temperature is detected by the temperature sensor 110, the output pulse width of the single pulse generator unit 880 may be set to be equal to or larger than the above-mentioned time delay. Thus, the charging amount can be increased.

The end of the second charging period may be detected by using only the detection output from the second temperature detection unit. In this case, as shown in, e.g., FIG. 19, only the input terminal h of the control circuit unit 850, and the output from the CR time constant circuit 890 may be input to the OR gate 860B. In this manner, the charging amount can be increased when a battery which has characteristics in that a temperature rise becomes abrupt at a relatively early timing in the final period of charging is to be charged at low temperature.

Furthermore, when charging is also ended in response to the output from the voltage comparator unit 500 during the second charging period, the reference voltage $V_{k2}$ may have different voltage values during the first and second charging periods. Since the charging current during the second charging period is lower than that in the first charging period, the rate of increase in temperature of the battery 10 in the final period of charging during the second charging period is also smaller than that during the first charging period. when the reference voltage $V_{k2}$ during the second charging period is set to be lower than that during the first charging period, reliability and safety can be further improved.

Figure 20:
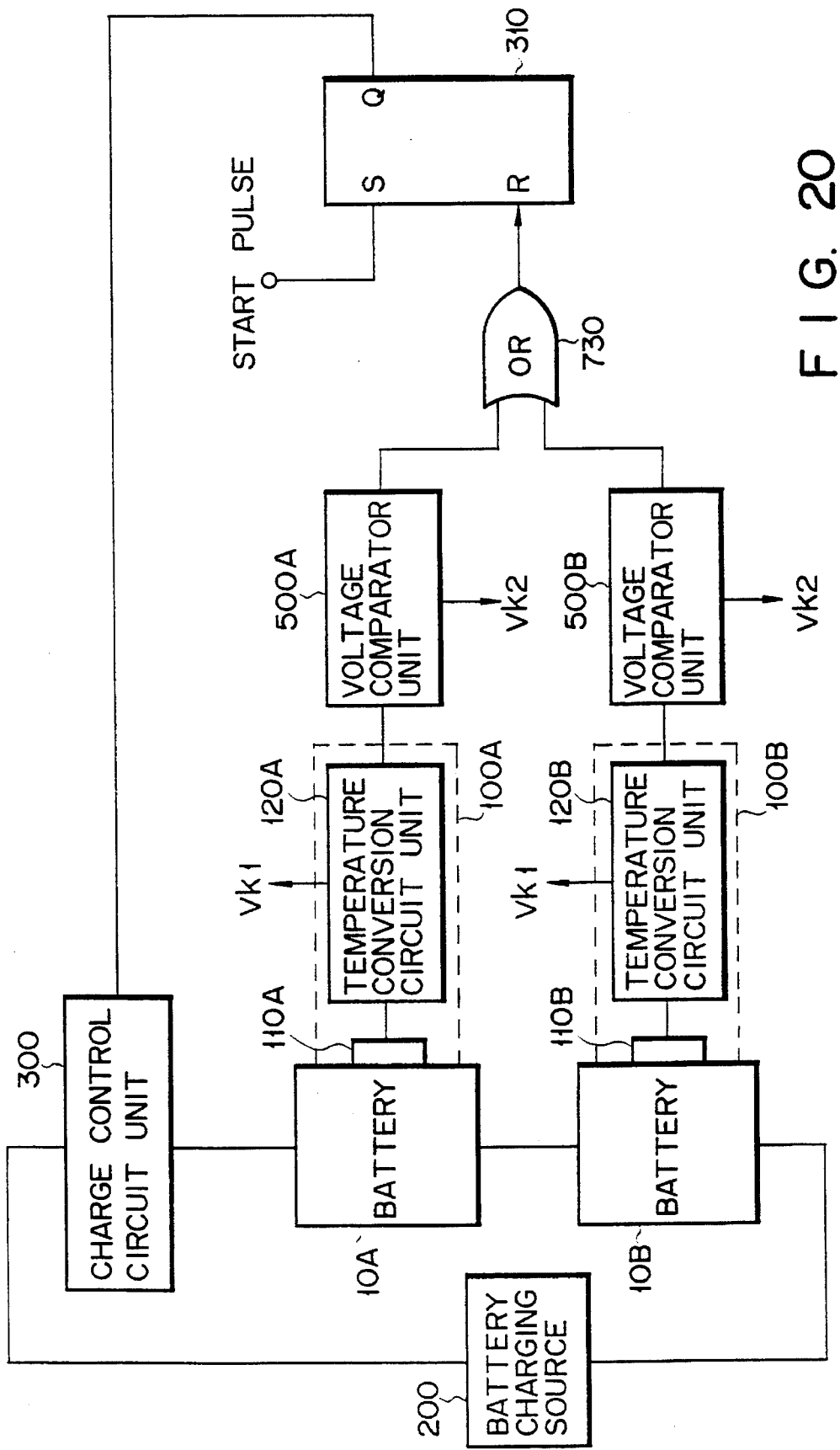
FIG. 20 is a circuit diagram showing a secondary battery charging circuit according to the fifth embodiment of the present invention.

FIG. 20 is a circuit diagram showing a charging circuit according to the fifth embodiment of the present invention.

Differences between this embodiment and the first embodiment are that a plurality of temperature detection units 100 are arranged, and an OR gate and a flip-flop are arranged between a voltage comparator unit and a charge control circuit unit while omitting the differential circuit unit 400.

In FIG. 20, a plurality of batteries 10A and 10B are connected in series with a charging source 200 via a change control circuit unit 300.

Temperature detection units 100A and 100B for detecting the temperatures of the batteries 10A and 10B and converting the detected temperatures into voltages are the same as that in the first embodiment. The outputs from the temperature detection units 100A and 100B are respectively connected to voltage comparator units 500A and 500B.

The outputs from the voltage comparator units 500A and 500B are respectively input to two input terminals of an OR gate 730, and the output terminal of the OR gate 730 is connected to a reset terminal R of a flip-flop circuit unit 310. A set terminal S of the flip-flop circuit unit 310 is connected to a start pulse application terminal. A non-inverted output terminal Q of the flip-flop circuit unit 310 is connected to a charge control circuit unit 300. The OR gate 730, the flip-flop circuit unit 310, and the charge control circuit 300 constitute a control unit for controlling charging of the batteries 10A and 10B in response to a detection output, generated earlier, of those from the voltage comparator units 500A and 500B.

Figure 21A:
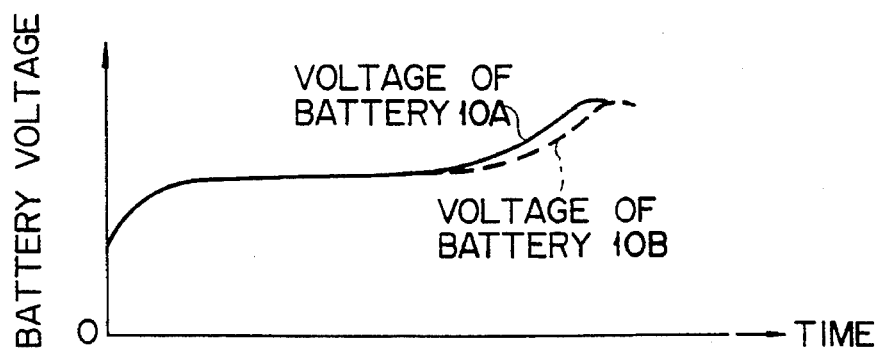
FIGS. 21A to 21F are graphs showing charging characteristics for explaining an operation of the circuit shown in FIG. 20.

The operations of the charging circuit shown in FIG. 20 will be described below with reference to charging characteristic graphs shown in FIGS. 21A to 21F. FIG. 21A shows voltages (battery voltages) of the batteries 10A and 10B, FIG. 21B shows temperatures (battery temperatures) of the batteries 10A and 10B, FIG. 21C shows outputs $V_{t1}$ and $V_{t2}$ from temperature conversion circuit units 120A and 120B, FIG. 21D shows an output from the voltage comparator unit 500A, FIG. 21E shows an output from the voltage comparator unit 500B, and FIG. 21F shows an output from the OR gate 730.

In general, the voltages of the batteries 10A and 10B are increased immediately in the initial period of charging, are increased slowly in the middle period of charging, and show a peak in the final period of charging, as shown in FIG. 21A. The temperatures of the batteries 10A and 10B are slowly increased over the initial and middle periods of charging, and are then immediately increased in the final period of charging, as shown in FIG. 21B. In this embodiment, since the battery 10A has a smaller electrical capacity than that of the battery 10B, the battery temperature of the battery 10B is assumed to immediately increase earlier than the battery 10A.

Figure 21B:
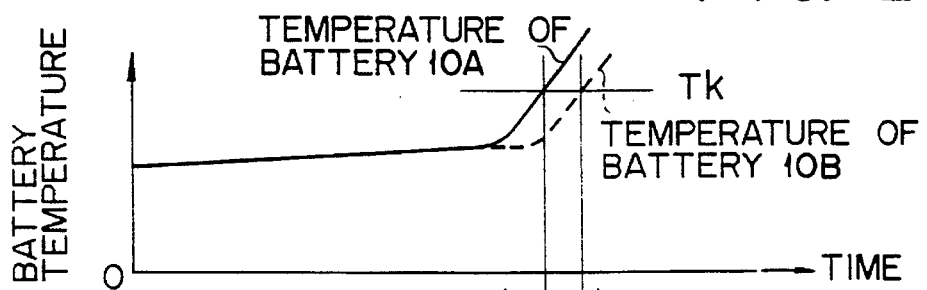
Figure 21C:
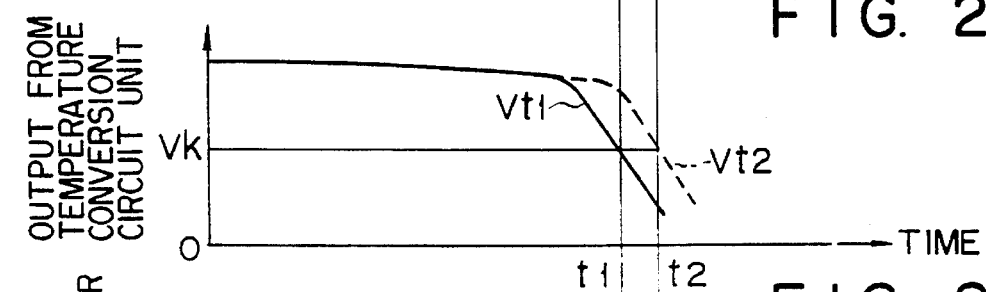
Figure 21D:
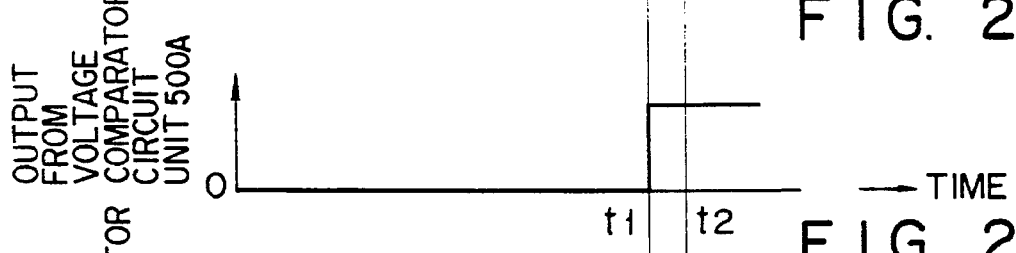
Figure 21E:
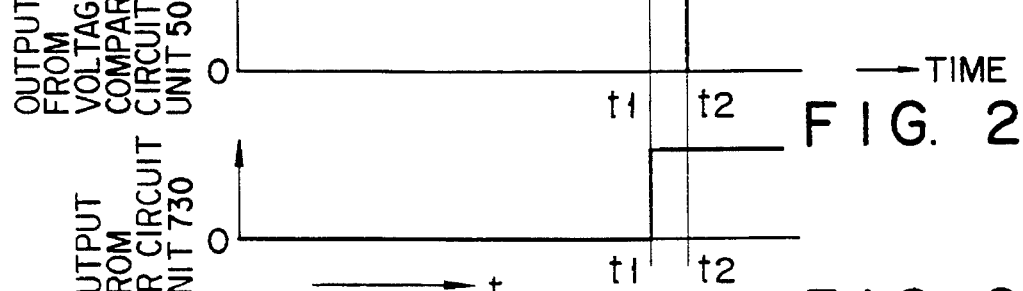
Figure 21F:
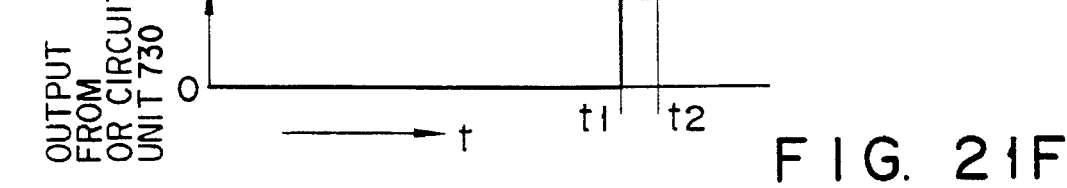

When a start pulse generated in synchronism with a power-on or a switch-on operation of the charging circuit is applied to the set terminal S of the flip-flop circuit unit 310, the output terminal Q of the flip-flop circuit unit 310 goes to high level, and the charge control circuit unit 300 is set in a fast charging state. In this state, a large current is supplied from the charging source 200 to the batteries 10A and 10B, thus starting fast charging.

when the charging operation continues, and reaches the final period of charging, as shown in FIG. 21B, the temperature of the battery 10A having a smaller electrical capacity begins to abruptly increase prior to the battery 10B. When the charging operation further continues, the temperature of the battery 10B begins to abruptly increase. As shown in FIG. 21C, the output value $V_{t1}$ from the temperature conversion circuit unit 120A is decreased first, and then, the output value $V_{t2}$ of the temperature conversion circuit 120B is decreased. The output values $V_{t1}$ and $V_{t2}$ are compared with a reference voltage $V_{k2}$ corresponding to a setting temperature $T_k$ by the voltage comparator units 500A and 500B. Based on the comparison results, $V_{t1} < V_{k2}$ is satisfied at time $t = t_1$, as shown in FIG. 21D, and the output from the voltage comparator unit 500A goes to high level. As shown in FIG. 21E, $V_{t2} < V_{k2}$ is satisfied at time $t = t_2$, and the output from the voltage comparator unit 500B goes to high level.

The outputs from the voltage comparator units 500A and 500B are input to the two input terminals of the OR gate 730. Since $t_1<t_2$, the output from the OR gate 730 goes to high level at time $t=t_1$, as shown in FIG. 21F. When the output from the OR gate 730 goes to high level, the output terminal Q of the flip-flop circuit unit 310 goes to low level, and the charge control circuit unit 300 is set in the charge control state. As a result, the charging operation is stopped, or the charging current is decreased.

Figure 22:
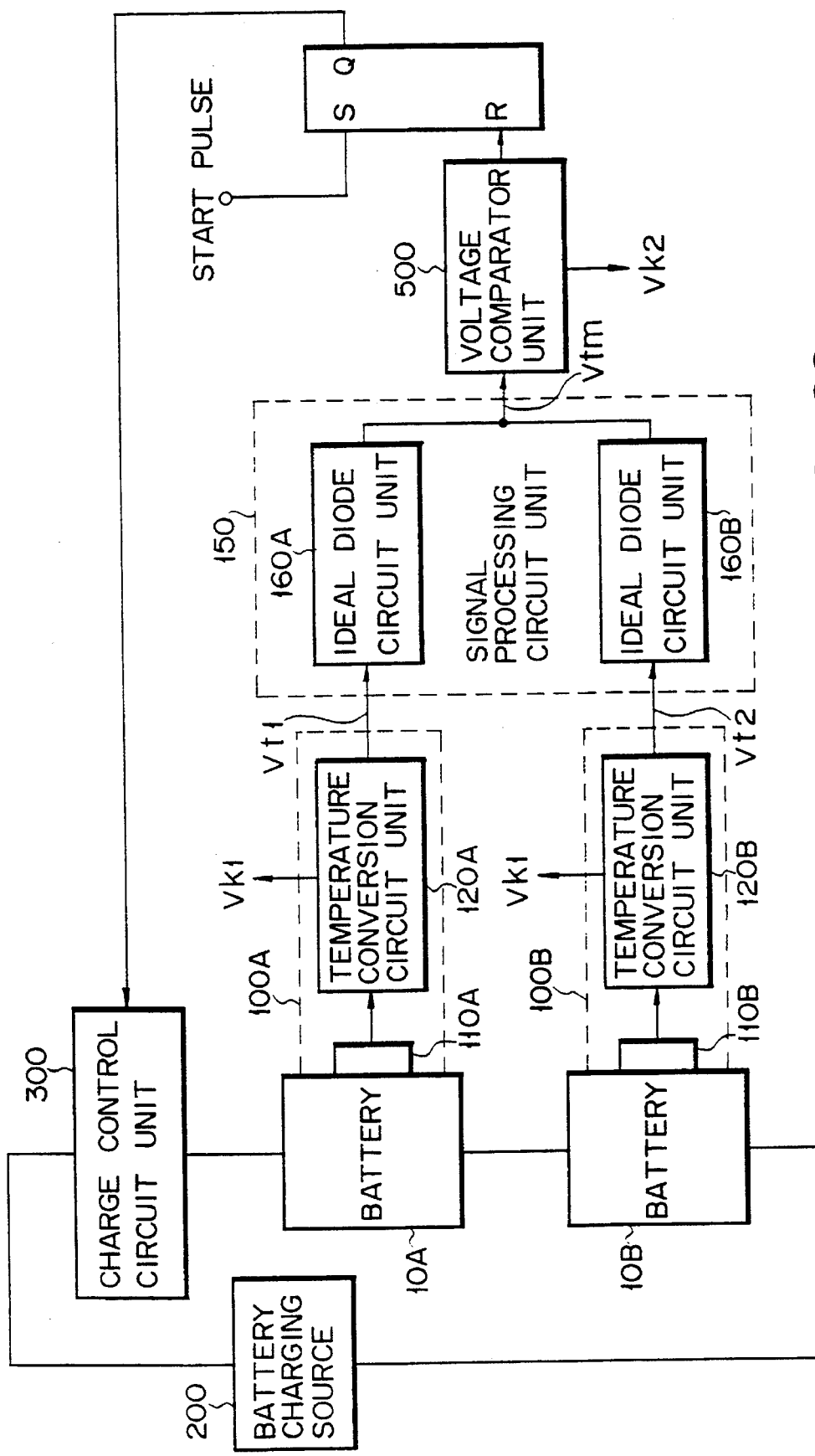
FIG. 22 is a circuit diagram showing a secondary battery charging circuit according to a modification of the fifth embodiment of the present invention.

A modification of the fifth embodiment of the present invention will be described below. FIG. 22 is a circuit diagram showing a charging circuit according to a modification of the fifth embodiment of the present invention. In FIG. 22, the charging source 200, the batteries 10A and 10B, and the temperature detection units 100A and 100B are the same as those in FIG. 20. The temperature detection unit shown in FIG. 20 is assumed to have the circuit shown in FIG. 4. In a description of this modification, however, the temperature detection unit is assumed to have the circuit shown in FIG. 2.

The output terminals of the temperature conversion circuit units 120A and 120B are connected to the two input terminals of a signal processing circuit unit 150. The signal processing circuit unit 150 is a circuit for outputting a voltage $V_{tm}$ corresponding to a higher one of voltages input to the two input terminals. More specifically, the voltage $V_{tm}$ corresponding to a higher one of the temperatures detected by the temperature detection units 100A and 100B is output from the output terminal of the signal processing circuit unit 150. As the temperature is increased, the voltage $V_{tm}$ is decreased.

As shown in FIG. 23, the signal processing circuit unit 150 comprises two ideal diode circuit units 160A and 160B. The ideal diode circuit unit 160A comprises resistors $R_3$ and $R_4$, an operational amplifier $A_1$, and diodes $D_1$ and $D_2$. The inverting input terminal of the operational amplifier $A_1$ is connected to an input terminal $d_1$ of the signal processing circuit unit 150 via the resistor $R_3$, is also connected to the output terminal of the operational amplifier $A_1$ via the diode $D_1$, and is then connected to the output terminal of the signal processing circuit unit 150 via the resistor $R_4$. The non-inverting input terminal of the operational amplifier $A_1$ is grounded, and the output terminal thereof is connected to the output terminal of the signal processing circuit unit 150 via the diode $D_2$. The ideal diode circuit unit 160B comprises resistors $R_5$ and $R_6$, an operational amplifier $A_2$, and diodes $D_3$ and $D_4$, which are connected in the same manner as in the ideal diode circuit unit 160A.

If voltages applied to input terminals $d_1$ and $d_2$ of the signal processing circuit unit 150 are represented by $V_{t1}$ and $V_{t2}$, and the resistances of the resistors $R_3$, $R_4$, $R_5$, and $R_6$ are respectively represented by $R_3$, $R_4$, $R_5$, and $R_6$, individual output voltages of the ideal diode circuit units 160A and 160B (output voltages obtained when their output terminals are not connected to each other as shown in FIG. 22) are respectively given by:

$-V_{t1}\cdot(R_4/R_3)$ $-V_{t2}\cdot(R_6/R_5)$

If $R_3=R_4$ and $R_5=R_6$, the individual output voltages of the ideal diode circuit units 160A and 160B are respectively $-V_{t1}$ and $-V_{t2}$.

Since the electrical capacity of the battery 10A is smaller than that of the battery 10B, the battery temperature of the battery 10A is abruptly increased earlier than the battery 10B in the final period of charging. Therefore, since $V_{t1}>V_{t2}>0$, the output voltage from the ideal diode circuit unit 160A becomes lower than that from the ideal diode circuit unit 160B. As a result, when the output terminals of the ideal diode circuit units 160A and 160B are connected to each other, as shown in FIG. 22, a lower voltage $-V_{t1}$ is output. More specifically, a voltage having a polarity opposite to a voltage corresponding to a higher one of the temperatures detected by the temperature detection units 100A and 100B is output from the signal processing circuit unit 150 as the output voltage $V_{tm}$.

The output from the signal processing circuit unit 150 is input to the inverting input terminal of the voltage comparator unit 500. The non-inverting input terminal of the voltage comparator unit 500 is connected to an application terminal of a reference voltage $V_{k2}$ corresponding to a setting temperature. when the output voltage value $V_{tm}$ exceeds the reference voltage $V_{k2}$, the output from the voltage comparator unit 500 is inverted to high level.

The output from the voltage comparator unit 500 is connected to the reset terminal R of the flip-flop circuit unit 310. The set terminal S of the flip-flop circuit unit 310 is connected to a start pulse application terminal. The non-inverted output terminal Q of the flip-flop circuit unit 310 is connected to the control terminal of the charge control circuit unit 300. The charge control circuit unit 300 has the same arrangement as that in the fifth embodiment. The voltage comparator unit 500, the flip-flop circuit unit 310, and the charge control circuit unit 300 constitute a control unit for controlling the charging operations of the batteries 10A and 10B when the output from the signal processing circuit unit 150 reaches a setting value.

Figures 24A, 24B, 24C, 24D, 24E:
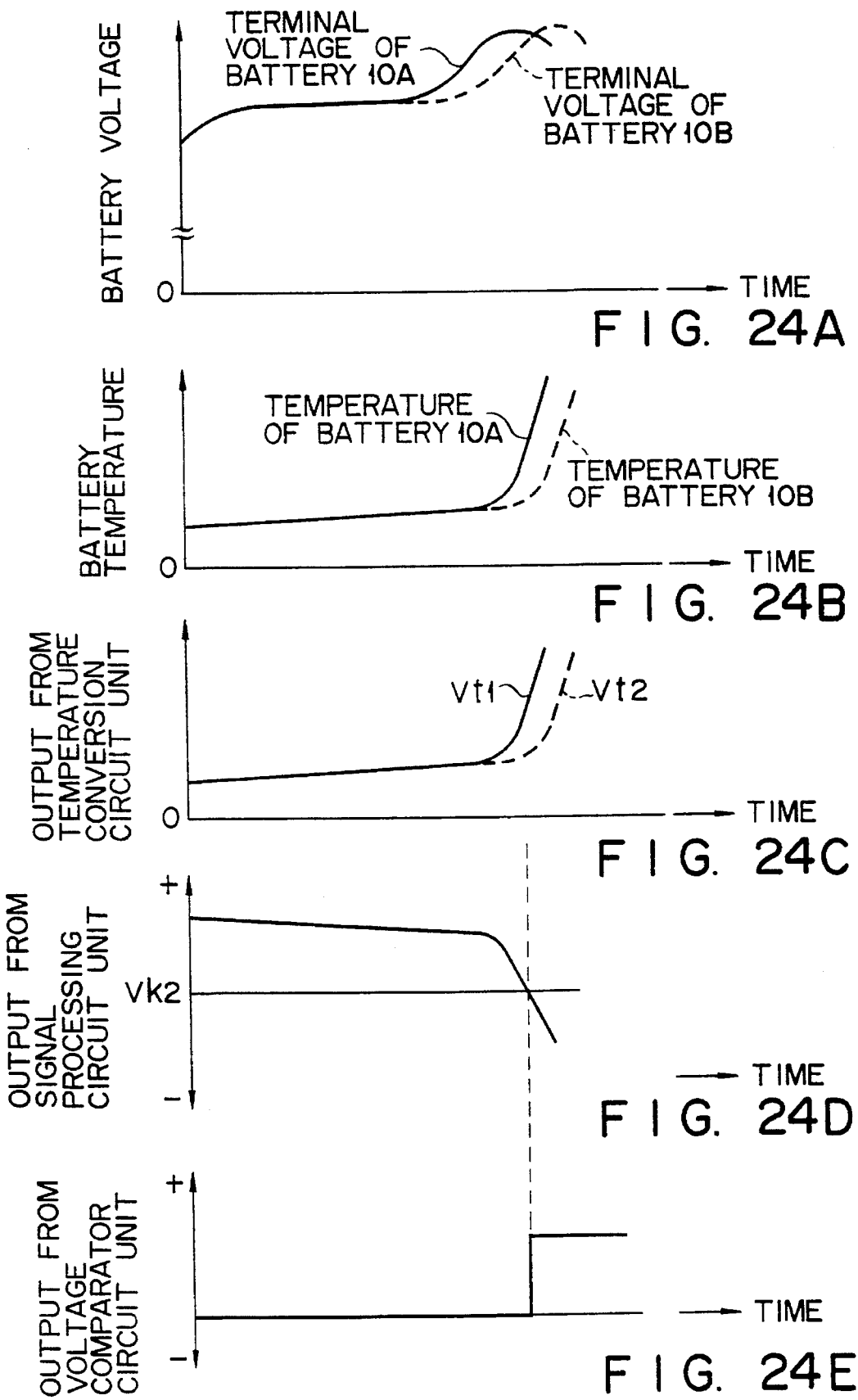
FIGS. 24A to 24E are graphs showing charging characteristics for explaining an operation of the circuit shown in FIG. 22.

The operation of the charging circuit shown in FIG. 22 will be described below with reference to charging characteristic graphs shown in FIGS. 24A to 24E. FIG. 24A shows changes in voltages (battery voltages) of the batteries 10A and 10B over time after charging is started, FIG. 24B shows changes in temperatures (battery temperatures) of the batteries 10A and 10B over time after charging is started, FIG. 24C shows changes in outputs $V_{t1}$ and $V_{t2}$ from the temperature conversion circuit units 120A and 120B over time after charging is started, FIG. 24D shows a change in output from the signal processing circuit unit 150 over time after charging is started, and FIG. 24E shows a change in output from the voltage comparator unit 500 over time after charging is started.

Like in the fifth embodiment shown in FIG. 20, as shown in FIG. 24A, the voltages of the batteries 10A and 10B are abruptly increased in the initial period of charging, are slowly increased in the middle period of charging, and show a peak in the final period of charging. As shown in FIG. 24B, the temperatures of the batteries 10A and 10B are slowly increased over the initial and middle periods of charging, and are abruptly increased in the final period of charging. In this embodiment, since the battery 10A has a smaller electrical capacity than that of the battery 10B, the battery temperature of the battery 10A is abruptly increased earlier than the battery 10B.

When a start pulse generated in response to a power-on or switch-on operation of the charging circuit is applied to the set terminal S of the flip-flop circuit unit 310, the output terminal Q of the flip-flop circuit unit 310 goes to high level, and the charge control circuit unit 300 is set in a fast charging state. In the fast charging state, a large current is supplied from the charging source 200 to the batteries 10A and 10B, thus starting fast charging.

when the charging operation continues, and the final period of charging is reached, as shown in FIG. 24B, the temperature of the battery 10A having a smaller electrical capacity begins to abruptly increase prior to the battery 10B. When the charging operation further continues, the temperature of the battery 10B begins to abruptly increase. As shown in FIG. 24C, the output value $V_{t1}$ from the temperature conversion circuit unit 120A is abruptly increased first, and then, the output value $V_{t2}$ from the temperature conversion circuit unit 120B is abruptly increased. Therefore, $V_{t1} > V_{t2}$ is satisfied, and a voltage $-V_{t1}$ appears at the output terminal of the signal processing circuit unit 150 as the output voltage $V_{tm}$. The voltage comparator unit 500 compares the output voltage $V_{tm}$ ($-V_{t1}$) from the signal processing circuit unit 150 with the reference voltage $V_{k2}$ corresponding to a setting temperature $T_k$, and when $V_{tm} < V_{k2}$ is satisfied, the output from the voltage comparator unit 500 is inverted to high level. More specifically, when one of the temperatures detected by the temperature detection units 100A and 100B reaches the setting temperature corresponding to the reference voltage $V_{k2}$, the voltage comparator unit 500 generates an inverted output.

Since the inverted output from the voltage comparator unit 500 is input to the reset terminal R of the flip-flop circuit unit 310, the output terminal Q of the flip-flop circuit unit 310 goes to low level, and the charge control circuit unit 300 is set in the charge control state. In the charge control state, no current is supplied from the charging source 200 to the batteries 10A and 10B, and the charging operation is stopped or the charging current is decreased.

FIG. 25 is a block diagram showing a charging circuit according to the sixth embodiment of the present invention.

Differences between this embodiment and the first embodiment are that an A/D converter unit 460 is used in place of the differential circuit unit, and a CPU 350, a timer circuit unit 360, and a memory 370 are used in place of the voltage comparator unit 500 and the charge control circuit unit 300.

In FIG. 25, a charging source 200 performs fast charging with a large charging current in an initial period of charging. Thereafter, when the CPU (microcomputer) 350 determines that fast charging is ended, the charging source 200 decreases the charging current and starts quick charging or trickle charging.

The temperature of a battery 10 is detected by a temperature detection unit 100, and is converted into a voltage. The voltage is output to the A/D converter unit 460. The output voltage input to the A/D converter unit 460 is converted into, e.g., an 8-bit digital value by the A/D converter unit 460, and the digital value is output as temperature data. The temperature data output from the A/D converter unit 460 is fetched by the CPU 350 in synchronism with a timing signal from the timer circuit unit 360 at a predetermined time interval (m), and is stored in the memory 370.

The memory 370 controlled by the CPU 350 comprises a programmable memory element such as a RAM, and has a plurality of (K) memory areas $M_0$ to $M_{K-1}$, as shown in FIG. 26. The memory 370 stores K temperature data at the m-time intervals from the A/D converter unit 460.

When the charging operation is started, the memory areas $M_0$ to $M_{K-1}$ are reset, and when a temperature measurement is started, first temperature data output from the A/D converter unit 460 is written in the memory area $M_0$. When new temperature data is output after an elapse of the m time, the data in the memory area $M_0$ is shifted to the memory area $M_1$ simultaneously with the data output operation, and the new temperature data is written in the memory area $M_0$. Similarly, every time new temperature data is output from the A/D converter unit 460, the temperature data in the respective memory areas are shifted to the next memory areas, and finally, temperature data for K×m time are stored in the memory areas $M_0$ to $M_{K-1}$. After the temperature data are stored in all the memory areas $M_0$ to $M_{K-1}$, every time new temperature data is output from the A/D converter unit 460, the oldest temperature data stored in the memory area $M_{K-1}$ is erased, and at the same time, the contents of the memory areas $M_0$ to $M_{K-2}$ are shifted to the next memory areas $M_1$ to $M_{K-1}$. Thus, the new temperature data is stored in the memory area $M_0$, thereby updating the storage contents.

If temperature data stored in the memory areas $M_0$ to $M_{K-1}$ are respectively represented by $T_0$ to $T_{K-1}$, the CPU 350 calculates difference data (to be referred to as temperature difference data hereinafter) $A_1$ to $A_{K-1}$ temperature data $T_1$ to $T_{K-1}$ as follows (see (a) in FIG. 27):

$$T_0 - T_1 = A_1$$
$$T_0 - T_2 = A_2$$
$$T_0 - T_3 = A_3$$
$$\ldots$$
$$T_0 - T_{K-2} = A_{K-2}$$
$$T_0 - T_{K-1} = A_{K-1}$$

The temperature difference data $A_1$ to $A_{K-1}$ correspond to the rates of increase in temperature at the respective timings at the m-time intervals. The CPU 350 checks if each of the temperature difference data $A_1$ to $A_{K-1}$ exceeds a predetermined value $\alpha$, and if the number of temperature data exceeding the predetermined value $\alpha$ reaches a predetermined value q ($1 \leq q \leq K-1$), the CPU 360 determines that the fast charging is ended. When the CPU 350 determines the end of fast charging, it controls the charging source 200 to decrease the charging current, and causes it to start quick charging or trickle charging.

Figure 27:
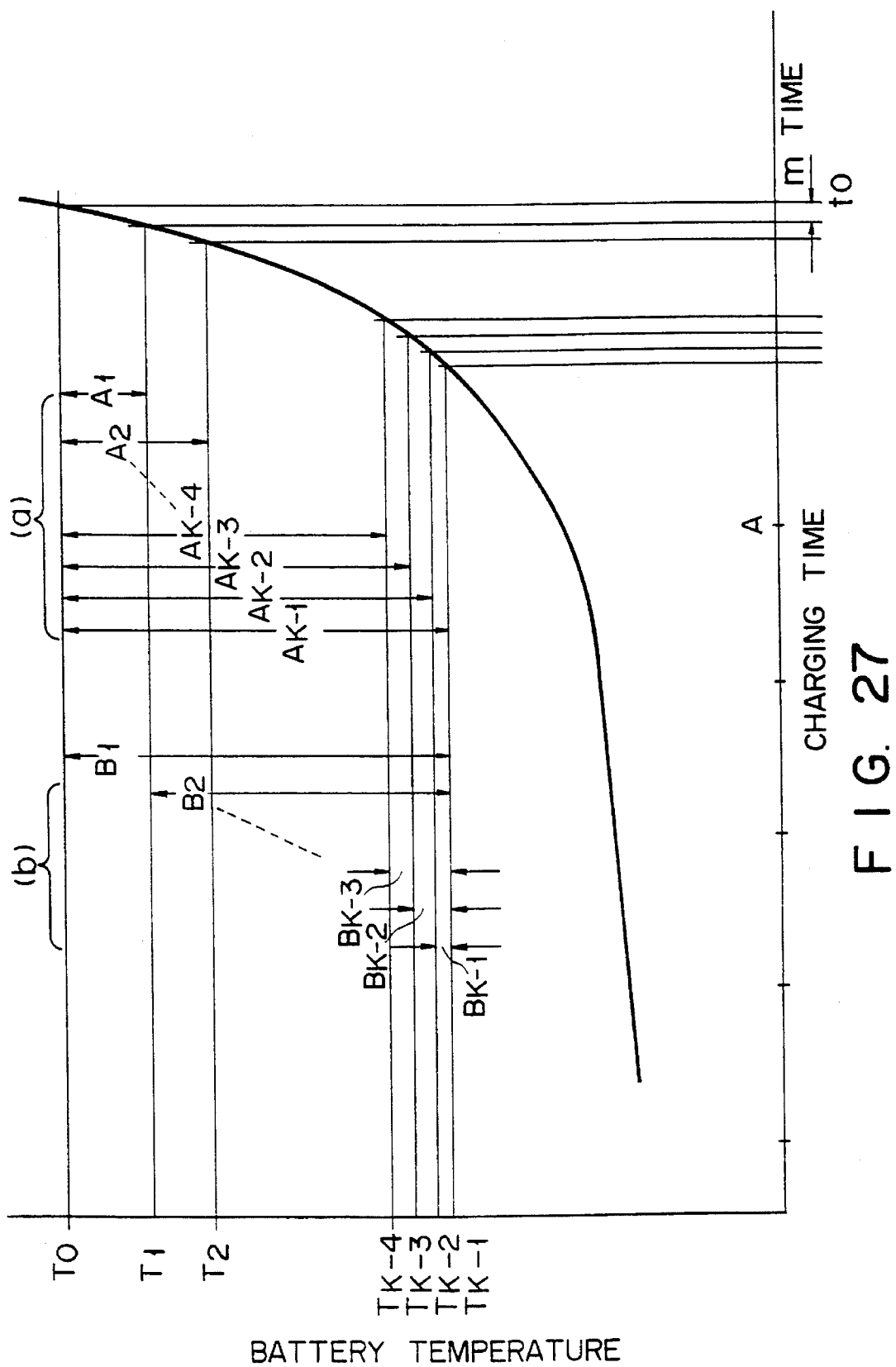
FIG. 27 is a graph for explaining the operation of the sixth embodiment.

In the above description, as shown in (a) in FIG. 27, the latest temperature data T 0 of the temperature data $T_0$ to $T_{K-1}$ is used as reference data. However, as shown in (b) in FIG. 27, temperature difference data may be obtained using the oldest temperature data $T_{K-1}$ as reference data. In this case, if temperature difference data are represented by $B_1$ to $B_{K-1}$, they can be calculated as follows:

$$T_0 - T_{K-1} = B_1$$
$$T_1 - T_{K-1} = B_2$$
$$T_2 - T_{K-1} = B_3$$
$$\ldots$$
$$T_{K-3} - T_{K-1} = B_{K-2}$$
$$T_{K-2} - T_{K-1} = B_{K-1}$$

The number of temperature data corresponding to temperature difference data exceeding the predetermined value &A in (a) in FIG. 27 is equal to or larger than that in (b) in FIG. 27, and basically the same result can be obtained. The methods shown in (a) and (b) in FIG. 27 can be selected depending on the characteristics of the battery 10. More specifically, when a battery in which an abrupt temperature rise begins relatively earlier in the final period of charging is to be charged, the method shown in (b) in FIG. 27 can be used. On the other hand, when a battery in which an abrupt temperature rise begins later in the final period of charging is to be charged, the method shown in (a) in FIG. 27 can be used. As reference temperature data for obtaining temperature difference data, temperature data other than data $T_O$ and $T_{K-1}$ may be used.

Figure 28:
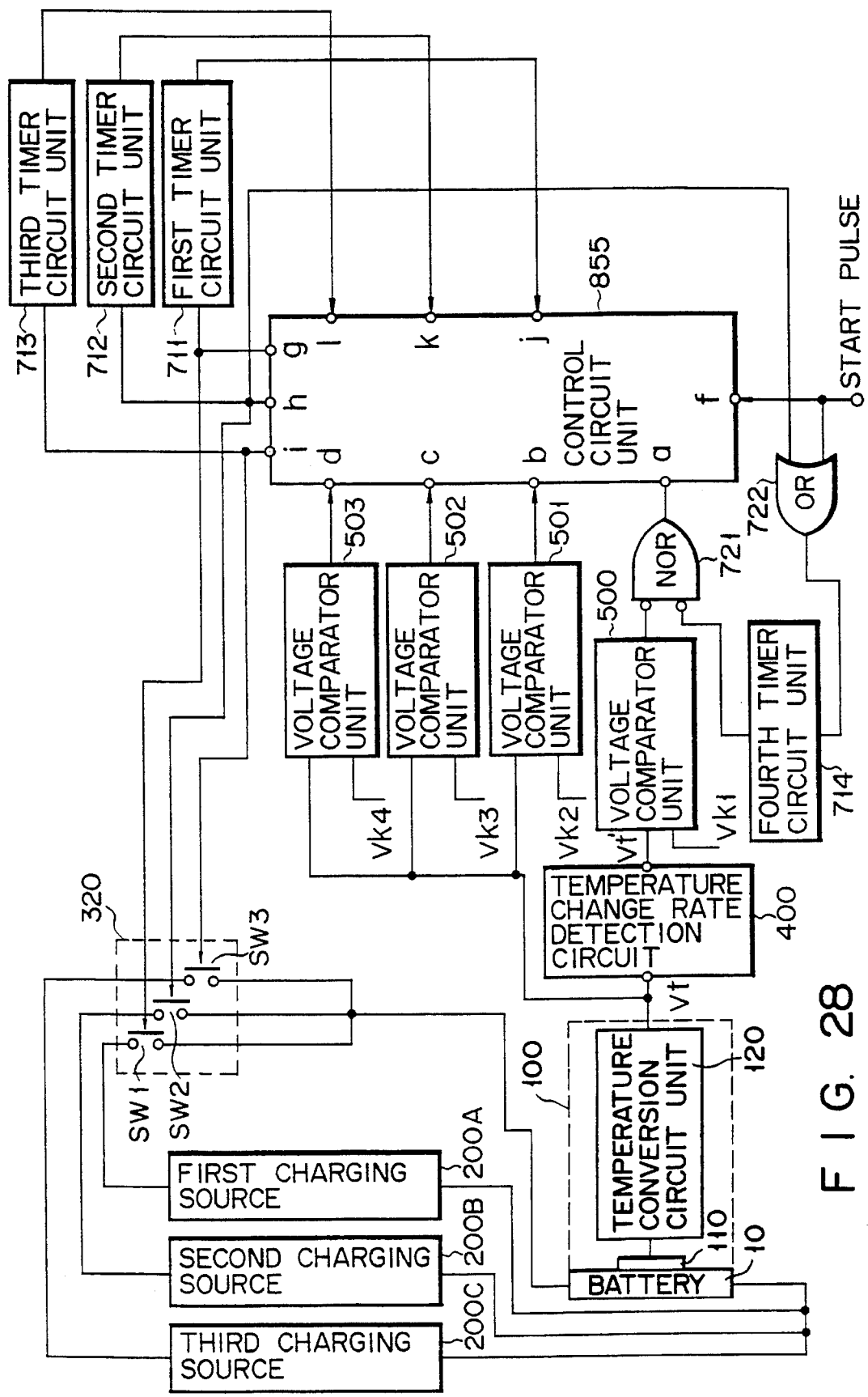
FIG. 28 is a block diagram showing an arrangement of a secondary battery charging circuit according to the seventh embodiment of the present invention.

FIG. 28 is a block diagram showing a secondary battery charging circuit according to the seventh embodiment of the present invention.

Differences between this embodiment and the first embodiment are that a switching circuit unit 320 is arranged in place of the control circuit unit, and a control circuit unit 855 is added between a voltage comparator unit 500 and a switching circuit unit 320. Furthermore, voltage comparator units 501, 502, and 503 are arranged between the control circuit unit 855, and a temperature detection unit 100, and a NOR gate 721, an OR gate 722, and first to fourth timer circuit units 711 to 714 are arranged.

The operation of this embodiment will be described below with reference to FIGS. 28 and 29.

In FIG. 28, a battery 10 is selectively connected to first, second, and third charging sources 200A, 200B, and 200C via a switching circuit unit 320 including three switches SW1, SW2, and SW3. The switches SW1, SW2, and SW3 comprise, e.g., transistors, thyristors, relays, or the like. The first charging source 200A is used for fast charging, the second charging source 200B is used for quick charging, and the third charging source 200C is used for trickle charging. The output currents from these charging sources are as follows. The output current from the second charging source 200B is smaller than that from the first charging source 200A, and the output current from the third charging source 200C is smaller than that from the second charging source 200B.

Like in the first embodiment, the temperature of the battery 10 is detected, and a detection signal is converted into an electrical signal. The electrical signal is converted into a rate of change in temperature by, e.g., differentiating the signal, and thereafter, the rate is compared with a setting value.

The output from the temperature detection unit 100 is connected to the inverting input terminals of the voltage comparator units 501, 502, and 503 in addition to a temperature change rate detection circuit 400. The non-inverting input terminals of the voltage comparator units 501, 502, and 503 are respectively applied with reference voltages $V_{k2}$, $V_{k3}$, and $V_{k4}$. These reference voltages can be set. The temperature detection unit 100 and the voltage comparator unit 501 constitute a first temperature detection unit, the temperature detection unit 100 and the voltage comparator unit 502 constitute a second temperature detection unit, and the temperature detection unit 100 and the voltage comparator unit 503 constitute a third temperature detection unit.

In the first temperature detection unit, when the temperature of the battery 10 is increased, and the output voltage $V_t$ from the temperature detection unit 100 is decreased and reaches the reference voltage $V_{k2}$, the output from the voltage comparator unit 501 is inverted from low level to high level. Thus, the first temperature detection unit generates a detection output indicating that the temperature of the battery 10 has reached a first setting temperature corresponding to the reference voltage $V_{k2}$.

The second and third temperature detection units perform the same operations as in the first temperature detection unit, and generate detection outputs indicating that the temperature of the battery 10 has reached second and third setting temperatures corresponding to the reference voltages $V_{k3}$ and $V_{k4}$, respectively.

The output from the voltage comparator unit 500 is input to an input terminal a of the control circuit unit 855 via one input terminal of the NOR gate 721 having two input terminals, and the outputs from the voltage comparator units 501, 502, and 503 are respectively input to input terminals b, c, and d of the control circuit unit 855.

A start pulse is input to the fourth timer circuit unit 714 via an input terminal f of the control circuit unit 855, and one input terminal of the OR gate 722 having two input terminals, and the output from the fourth timer circuit unit 714 is input to the other input terminal of the NOR gate 721. The other input terminal of the OR gate 722 is connected to an input terminal h of the control circuit unit 855. The NOR gate 721, the OR gate 722, and the fourth timer circuit unit 714 constitute a circuit for inhibiting charge control upon generation of an inverted output for a predetermined period of time from the beginning of a first charging period, and from the beginning of a second charging period.

Output terminals g, h, and i of the control circuit unit 855 are respectively connected to the control terminals of the switches SW1, SW2, and SW3 of the switching circuit unit 320. The output terminals g, h, and i of the control circuit unit 855 are also respectively connected to the first, second, and third timer circuit units 711, 712, and 713. The output terminals of the first to third timer circuit units 711 to 713 are connected to the control circuit unit 855.

Charge control is performed as follows.

Figure 29:
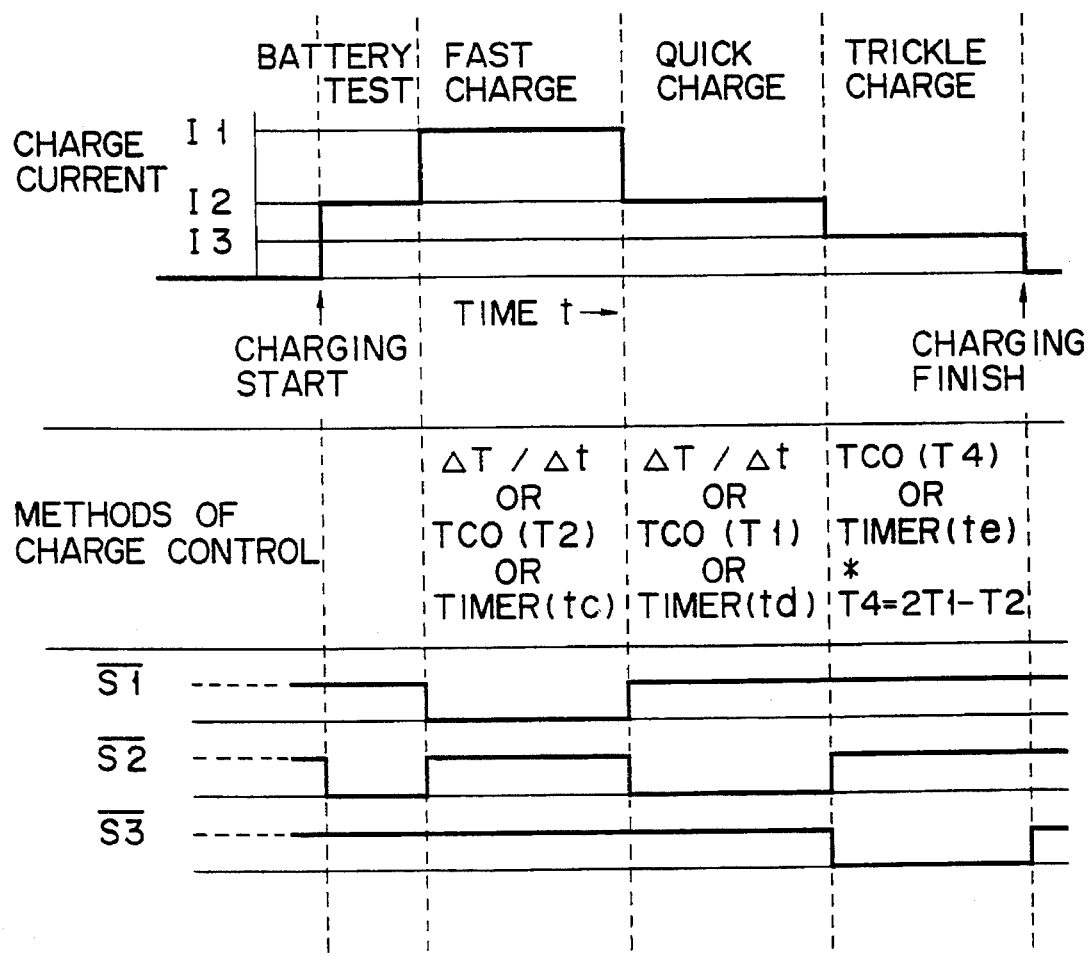
FIG. 29 is a chart showing an operation of the circuit shown in FIG. 28.

As shown in FIG. 29, when a charging operation is started, the battery 10 is tested. If it is determined based on the test result of the battery 10 that the battery voltage falls outside a predetermined value range or that ambient temperature falls outside a predetermined range, the charging operation is stopped. As a result of the battery test, if no problem is found, a start pulse is input to the input terminal f of the control circuit unit 855, thus starting fast charging in the first charging period. At this time, an output is generated from the output terminal g of the control circuit unit 855 to turn on the switch SW1 of the switching circuit unit 320, and to start the first timer circuit unit. The start pulse is simultaneously input to the OR gate 722 to start the fourth timer circuit unit 714. Since the output from the NOR gate 721 maintains low level while the output from the fourth timer circuit unit 714 is kept at high level, the input to the input terminal a of the control circuit unit 855 is kept at low level. Thus, even when the output from the temperature change rate detection circuit 400 goes to low level due to a voltage drift immediately after the beginning of the charging operation, the first charging period can be maintained, and the second charging period will not be started.

The end of the first charging period is determined based on one of the following three conditions.

1) In the final period of charging, when the output from the voltage comparator unit 500 is inverted from high level to low level since the rate of change in temperature is abruptly increased, and an output $V_t'$ from the temperature change rate detection circuit 400 exceeds a reference voltage $V_{k1}$, the output from the NOR gate 721 goes to high level. When the high-level output is input to the input terminal a of the control circuit unit 855, the switch SW1 of the switching circuit unit 320 is turned off in response to a signal from the output terminal g of the control circuit unit 855.

2) In the final period of charging, when the output from the voltage comparator unit 501 is inverted from high level to low level since the temperature of the battery 10 is increased, and a voltage output $V_t$ from the temperature detection unit 100 exceeds a reference voltage $V_{k2}$, the inverted output is input to the input terminal b of the control circuit unit 855. Thus, the switch SW1 of the switching circuit unit 320 is turned off in response to a signal from the output terminal g of the control circuit unit 855.

3) Upon an elapse of a setting time of the first timer circuit unit 711, which is started simultaneously with the start of the first charging period, the output from the first timer circuit unit 711 is input to the input terminal j of the control circuit unit 855. Thus, the switch SW1 of the switching circuit unit 320 is turned off in response to a signal from the output terminal g of the control circuit unit 855.

when one of the above-mentioned three conditions is satisfied, and the switch SW1 is turned off, a control signal is generated from the output terminal h of the control circuit unit 855, and the switch SW2 is turned on. At the same time, the second timer circuit unit 712 is started, and quick charging in the second charging period is started.

Since the output signal from the output terminal h of the control circuit unit 855 is input to the OR gate 722 simultaneously with the start of the second charging period for a predetermined period of time from the beginning of quick charging as the second charging period like in a state immediately after the beginning of the first charging period, the second charging period is inhibited from being ended. The reason for this is the same as that for inhibiting the first charging period from being ended for a predetermined period of time from the beginning. Since a change in battery temperature immediately after the first charging period transits to the second charging period is the same as that at the beginning of fast charging, the end of the second charging period is controlled by the following three conditions like in the end conditions of the first charging period.

1) In the final period of charging, when the output from the voltage comparator unit 500 is inverted from high level to low level since the rate of change in temperature is abruptly increased, and an output $V_t'$ from the temperature change rate detection circuit 400 exceeds a reference voltage $V_{k1}$, the output from the NOR gate 721 goes to high level. When the high-level output is input to the input terminal a of the control circuit unit 855, the switch SW2 of the switching circuit unit 320 is turned off in response to a signal from the output terminal h of the control circuit unit 855.

2) In the final period of charging, when the output from the voltage comparator unit 502 is inverted from high level to low level since the temperature of the battery 10 is increased, and a voltage output $V_t$ from the temperature detection unit 100 exceeds a reference voltage $V_{k3}$, the inverted output is input to the input terminal c of the control circuit unit 855. Thus, the switch SW2 of the switching circuit unit 320 is turned off in response to a signal from the output terminal h of the control circuit unit 855.

3) Upon an elapse of a setting time of the second timer circuit unit 712, which is started simultaneously with the start of the second charging period, the output from the second timer circuit unit 712 is input to the input terminal k of the control circuit unit 855. Thus, the switch SW2 of the switching circuit unit 320 is turned off in response to a signal from the output terminal h of the control circuit unit 855.

When one of the above-mentioned three conditions is satisfied, and the switch SW2 is turned off, a control signal is generated from the output terminal i of the control circuit unit 855 to turn on the switch SW3, and to start the third timer circuit unit 713, thus starting trickle charging in the third charging period.

Since the trickle charging is performed in the third charging period, almost no abrupt increase in temperature is observed in the final period of charging. Therefore, the end of the third charging period is controlled by the following two conditions.

1) when the error occurs in the charging circuit and the output from the voltage comparator unit 503 is inverted from high level to low level since the temperature of the battery 10 is increased, and a voltage output $V_t$ from the temperature detection unit 100 exceeds a reference voltage $V_{k4}$, the inverted output is input to the input terminal d of the control circuit unit 855. Thus, the switch SW3 of the switching circuit unit 320 is turned off in response to a signal from the output terminal i of the control circuit unit 855.

2) Upon an elapse of a setting time of the third timer circuit unit 713, which is started simultaneously with the start of the third charging period, the output from the third timer circuit unit 713 is input to the input terminal k of the control circuit unit 855. Thus, the switch SW3 of the switching circuit unit 320 is turned off in response to a signal from the output terminal i of the control circuit unit 855.

when one of the above-mentioned two conditions is satisfied, and the switch SW3 is turned off, the charging operation by the circuit of this embodiment is finished.

The reference voltage V k4 to be input to the voltage comparator unit 503 may be determined as follows in relation to the voltage comparator units 501 and 502:

(Temperature Upper Limit Setting Value of Trickle Charging)=2× (Temperature Upper Limit Setting Value of Quick Charging)− (Temperature Upper Limit Setting Value of Fast Charging)

Alternatively, the control circuit unit 855 may adjust the voltage to satisfy the above relation.

As described above, in the seventh embodiment, since the charging operation is performed in the order of fast charging, quick charging, and trickle charging, a battery can be charged to almost 100% of its capacity within a short period of time without overloading the battery. Furthermore, when some circuit components malfunction, and charge control based on a change in temperature is disabled, since charge control can be performed by the corresponding charge control timer circuit unit, a battery and equipment using the battery can be prevented from being damaged due to an abnormal increase in temperature by overcharging.

The present invention is not limited to the above embodiments, and various modifications may be made as follows.

In each of the first to seventh embodiments, a nickel-hydrogen battery is used as a secondary battery. However, the present invention can be applied to a case wherein other secondary batteries, such as a nickel-cadmium battery, a lead-acid battery, and the like are used.

The temperature detection unit 100 comprises the temperature sensor (thermistor Th) 110, and the temperature conversion circuit unit 120, but may comprise another arrangement. For example, the temperature detection unit 100 may comprise a combination of a resistive temperature sensor and a resistance-voltage converter, or may comprise an arrangement utilizing characteristics in that when a constant current is flowed, a forward voltage effect of a diode almost linearly changes upon a change in temperature.

The respective units of each of the above embodiments are constituted by hardware components (except for the seventh embodiment). However, some or all of the units except for the temperature sensor may be realized in a software manner using, e.g., a microcomputer for executing processing based on a program.

The charge control is performed based only on temperature data, but may be executed in combination with another charge control method.

In the third embodiment, the flip-flop circuit unit may comprise a set priority type flip-flop which is set in response to a charge start signal, and is reset in response to a comparison output from the comparator unit, and the signal identification circuit unit may output the charge start signal to the set input of the set priority type flip-flop for a predetermined period of time after the comparator unit generates a comparison output.

In the fourth embodiment, the following arrangements may be available.

(1) Only the fast charging switch SW1 of the switching circuit unit 320 is set in an ON state during the first charging period. However, the quick charging switch SW2 may also be set in an ON state. More specifically, a current as a combination of output currents from the first and second charging sources 200A and 200B may be used as a current I 1. with this arrangement, the output capacity of the first charging source 200A can be decreased.

(2) The two different charging sources, i.e., the first and second charging sources 200A and 200B are prepared. However, only one charging source may be used, and an output current value may be varied between the first and second charging periods under the external control.

(3) The charging current is completely cut off upon completion of the second charging period. However, a third charging source may be connected to a node between the switches SW1 and SW2 of the switching circuit unit 320, or a resistor may be connected in parallel with the switch SW1 or SW2, so that a battery is charged with a smaller current $I_3$ by quick charging after the second charging period is ended. Normally, the current $I_3$ is set to be about 0.1 CmA. In this manner, a battery can be charged to near 100% of its capacity, and a decrease in charging amount due to self-discharging can be prevented.

In the fifth embodiment, the following arrangements are also available.

(1) In the embodiment shown in FIG. 20, the temperature detection circuit is constituted by the temperature conversion circuit units 120A and 120B, and the voltage comparator units 500A and 500B. Voltages $V_{t1}$ and $V_{t2}$ corresponding to the battery temperatures are compared with a reference voltage $V_{k2}$, and when one battery temperature reaches a setting value, the inverted output is generated. However, the following arrangements may be adopted.

(a) Another temperature sensor for detecting ambient temperature of a battery may be arranged. An output from the temperature sensor is converted into a voltage by a temperature conversion circuit, and when a difference between the output from this temperature conversion circuit and the output from the temperature conversion circuit unit 120A or 120B reaches a setting value, the inverted output may be generated. In this case, since charge control is performed when the battery temperature is increased by a predetermined value with respect to ambient temperature, the charge control is not easily influenced by ambient temperature.

(b) The temperature detection circuit may comprise a memory circuit for storing output voltages in the initial period of charging from the temperature conversion circuit units 120A and 120B, and may generate an inverted output when the difference between the output stored in the memory circuit and the output from the temperature conversion circuit unit 120A or 120B reaches a setting value. In this case, since charge control can be executed when the battery temperature is increased by a predetermined value from a temperature in the initial period of charging, the charge control is not easily influenced by ambient temperature.

(c) The temperature detection circuit may generate an inverted output when the rate of change in output from the temperature conversion circuit unit 120A or 120B reaches a predetermined value. In this case, since charge control can be executed when the battery temperature is increased by a predetermined value from a temperature in the initial period of charging, the charge control is not easily influenced by ambient temperature.

(2) In the embodiment shown in FIG. 22, the output voltage V tm from the signal processing circuit unit 150 is compared with the reference voltage $V_{k2}$ by the voltage comparator unit 500, and when the highest battery temperature detected by the signal processing circuit unit 150 reaches a setting value, an inverted output is generated. However, the following arrangements (d) to (f) may be adopted.

(d) An output from another temperature sensor for detecting ambient temperature of a battery may be converted into a voltage by a temperature conversion circuit, and when the difference between the output from this temperature conversion circuit and the output from the signal processing circuit unit 150 reaches a setting value, an inverted output may be generated, thereby controlling a charging operation of the battery. In this case, since charge control can be performed when the battery temperature is increased by a predetermined value with respect to ambient temperature, the charge control is not easily influenced by ambient temperature.

(e) A memory circuit for storing an output voltage in the initial period of charging from the signal processing circuit unit 150 may be arranged, and the difference between the output from the memory circuit and the output from the signal processing circuit unit 150 may be detected. When the difference reaches a setting value, an inverted output may be generated to control a charging operation of a battery. In this case, since charge control can be executed when the battery temperature is increased by a predetermined value from a temperature in the initial period of charging, the charge control is not easily influenced by ambient temperature.

(f) The temperature detection circuit units 100A and 100B may generate detection outputs which almost linearly change in accordance with changes in temperature detected by the temperature sensors 110A and 110B, and an inverted output may be generated when the rate of change in output from the signal processing circuit unit 150 reaches a predetermined value, thereby controlling a charging operation of a battery. In this case, since charge control can be executed when the battery temperature begins to abruptly increase in the final period of charging, the charge control is not easily influenced by ambient temperature, and overcharging can be prevented.

(3) In the embodiments shown in FIGS. 20 and 22, the following arrangements are also available.

(a) Two sets of temperature sensors and temperature detection circuit units are arranged. However, three or more sets of temperature sensors and temperature detection circuit units may be arranged.

(b) The temperatures of batteries are individually measured. However, a plurality of batteries may be classified into a plurality of groups having similar thermal conditions, and the temperature may be measured in units of groups.

(c) The charge control is performed by measuring the temperatures of a plurality of batteries connected in series with each other. However, a charging operation may be performed by measuring the temperatures of different portions of one secondary battery. In a large-capacity battery, its vessel is large in size, and heat is often locally generated. The temperatures of a plurality of portions of such a secondary battery are measured, and charge control according to the present invention may be performed according to the measurement results. Thus, the charging operation can be performed without overcharging.

(d) The temperatures of a plurality of batteries connected in series with each other are measured to perform charge control. However, the present invention can be similarly applied to a plurality of batteries connected in parallel with each other, and to a plurality of batteries connected in series and parallel with each other.

Various other changes and modifications may be made within the spirit and scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A secondary battery charging circuit comprising:

a first charging source for supplying a charging current to a secondary battery;

a second charging source for supplying a charging current smaller than the charging current from said first charging source to said secondary battery;

a third charging source for supplying a charging current smaller than the charging current from said second charging source to said secondary battery;

switching means for connecting said first charging source to said secondary battery during a first charging period, connecting said second charging source to said secondary battery during a second charging period, and connecting said third charging source to said secondary battery during a third charging period;

first temperature detection means for detecting that a temperature of said secondary battery has reached a first setting temperature $T_1$, and generating a detection output;

second temperature detection means for detecting that the temperature of said secondary battery has reached a second setting temperature $T_2$ higher than the first setting temperature $T_1$, and generating a detection output;

third temperature detection means for detecting that the temperature of said secondary battery has reached a third setting temperature $T_3$ higher than the second setting temperature $T_2$, and generating a detection output;

temperature change rate detection means for detecting a rate of change in temperature of said secondary battery with respect to time;

comparator means for comparing an output value from said temperature change rate detection means during a charging operation to said secondary battery with a setting value, and for, when the output value reaches the setting value, generating an inverted output;

a first timer means started simultaneously with start of the first charging period;

a second timer means started simultaneously with start of the second charging period;

a third timer means started simultaneously with start of the third charging period;

control means for starting the second charging period in response to one, generated earliest, of the inverted output from said comparator means, the detection output from said first temperature detection means, and a timer output from said first timer during the first charging period, starting the third charging period in response to one, generated earliest, of the inverted output from said comparator means, the detection output from said second temperature detection means, and a timer output from said second timer during the second charging period, and ending the third charging period in response to one, generated earlier, of the detection output from said third temperature detection means and a timer output from said third timer during the third charging period; and charge control inhibition means for inhibiting charge control upon generation of the inverted output for a predetermined period of time from the beginning of each of the first and second charging periods.

2. A circuit according to claim 1, wherein said charge control inhibition means includes means which satisfies a relation $t_a \leq t_b$, between an inhibition time $t_a$ from the beginning of the first charging period and an inhibition time $t_b$ from the beginning of the second charging period.

3. A circuit according to claim 1, wherein the third setting temperature is set to be given by $T_3 = 2 \times T_2 - T_1$.

4. A circuit according to claim 3, wherein said charge control inhibition means includes means which satisfies a relation $t_a \leq t_b$, between an inhibition time $t_a$ from the beginning of the first charging period and an inhibition time $t_b$ from the beginning of the second charging period.

* * * * *